United States Patent
McCauley et al.

(10) Patent No.: US 11,867,052 B1
(45) Date of Patent: Jan. 9, 2024

(54) PRECISION TARGETING WITH SIMULATED WELL LOGS

(71) Applicant: EOG Resources, Inc., Houston, TX (US)

(72) Inventors: Kacey McCauley, Houston, TX (US); Hung Nguyen, Houston, TX (US); Madhukar Thumma, Houston, TX (US); Tri Phan, Pearland, TX (US); Sandeep Bhakhri, Houston, TX (US); Brian Tapp, Arvada, CO (US); Jay Ramineni, Katy, TX (US)

(73) Assignee: EOG Resources, Inc., Houston, TX (US)

( * ) Notice: Subject to any disclaimer, the term of this patent is extended or adjusted under 35 U.S.C. 154(b) by 589 days.

(21) Appl. No.: 16/653,651

(22) Filed: Oct. 15, 2019

Related U.S. Application Data

(60) Provisional application No. 62/745,097, filed on Oct. 12, 2018.

(51) Int. Cl.
| | |
|---|---|
| *E21B 49/00* | (2006.01) |
| *E21B 44/00* | (2006.01) |
| *G01V 5/12* | (2006.01) |
| *G01V 99/00* | (2009.01) |
| *E21B 41/00* | (2006.01) |

(52) U.S. Cl.
CPC .......... *E21B 49/00* (2013.01); *E21B 41/0092* (2013.01); *E21B 44/00* (2013.01); *G01V 5/12* (2013.01); *G01V 99/005* (2013.01)

(58) Field of Classification Search
CPC ...... E21B 49/00; E21B 41/0092; E21B 44/00; E21B 7/04; G01V 5/12; G01V 99/005; G01V 3/18; G01V 3/28; G01V 5/04; G01V 11/00
See application file for complete search history.

(56) References Cited

U.S. PATENT DOCUMENTS

| | | | | |
|---|---|---|---|---|
| 6,957,145 | B2* | 10/2005 | Spross | E21B 49/00 |
| | | | | 702/8 |
| 2004/0231842 | A1* | 11/2004 | Shammai | E21B 49/10 |
| | | | | 166/264 |
| 2013/0110486 | A1* | 5/2013 | Polyakov | E21B 49/00 |
| | | | | 703/10 |

(Continued)

FOREIGN PATENT DOCUMENTS

| | | | | |
|---|---|---|---|---|
| CN | 101932955 A | * | 12/2010 | G01V 3/28 |
| CN | 103827696 A | * | 5/2014 | G01V 1/42 |

(Continued)

OTHER PUBLICATIONS

Polyakov et al., U.S. Patent Application Publication 2013/0110486, see the shortened.*

*Primary Examiner* — Kandasamy Thangavelu
(74) *Attorney, Agent, or Firm* — Baker Botts L.L.P.

(57) ABSTRACT

Methods and systems for controlling a drilling operation in a subterranean formation are disclosed. The method includes generating a simulated well log based, at least in part, on a subset of an MWD log from a horizontal well, wherein the subset of the MWD log is for measured depths between a starting measured depth and an ending measured depth. The method further includes monitoring and/or controlling a drilling operation based, at least in part, on the simulated well log.

19 Claims, 32 Drawing Sheets

(56) References Cited

U.S. PATENT DOCUMENTS

2015/0000980 A1\* 1/2015 Williams .............. E21B 49/003
  175/45
2015/0134255 A1\* 5/2015 Zhang ...................... G01V 5/04
  702/14
2017/0306750 A1\* 10/2017 Carpenter ................ G01V 3/00
2018/0252101 A1\* 9/2018 Bartetzko ................ G01V 3/18

FOREIGN PATENT DOCUMENTS

| CN | 105339586 A | \* | 2/2016 | ............... G01V 5/04 |
| CN | 103958829 B | \* | 3/2017 | ........... E21B 47/095 |
| EP | 0718641 A2 | \* | 6/1996 | ........... G01V 11/00 |
| WO | WO 2016/044464 A1 | \* | 3/2016 | ............... E21B 7/04 |
| WO | WO 2016053330 A1 | \* | 4/2016 | ............... G01V 3/00 |
| WO | WO 2017019718 A1 | \* | 2/2017 | ............ E21B 7/002 |
| WO | WO 2017/116436 A1 | \* | 7/2017 | ............. E21B 44/00 |

\* cited by examiner

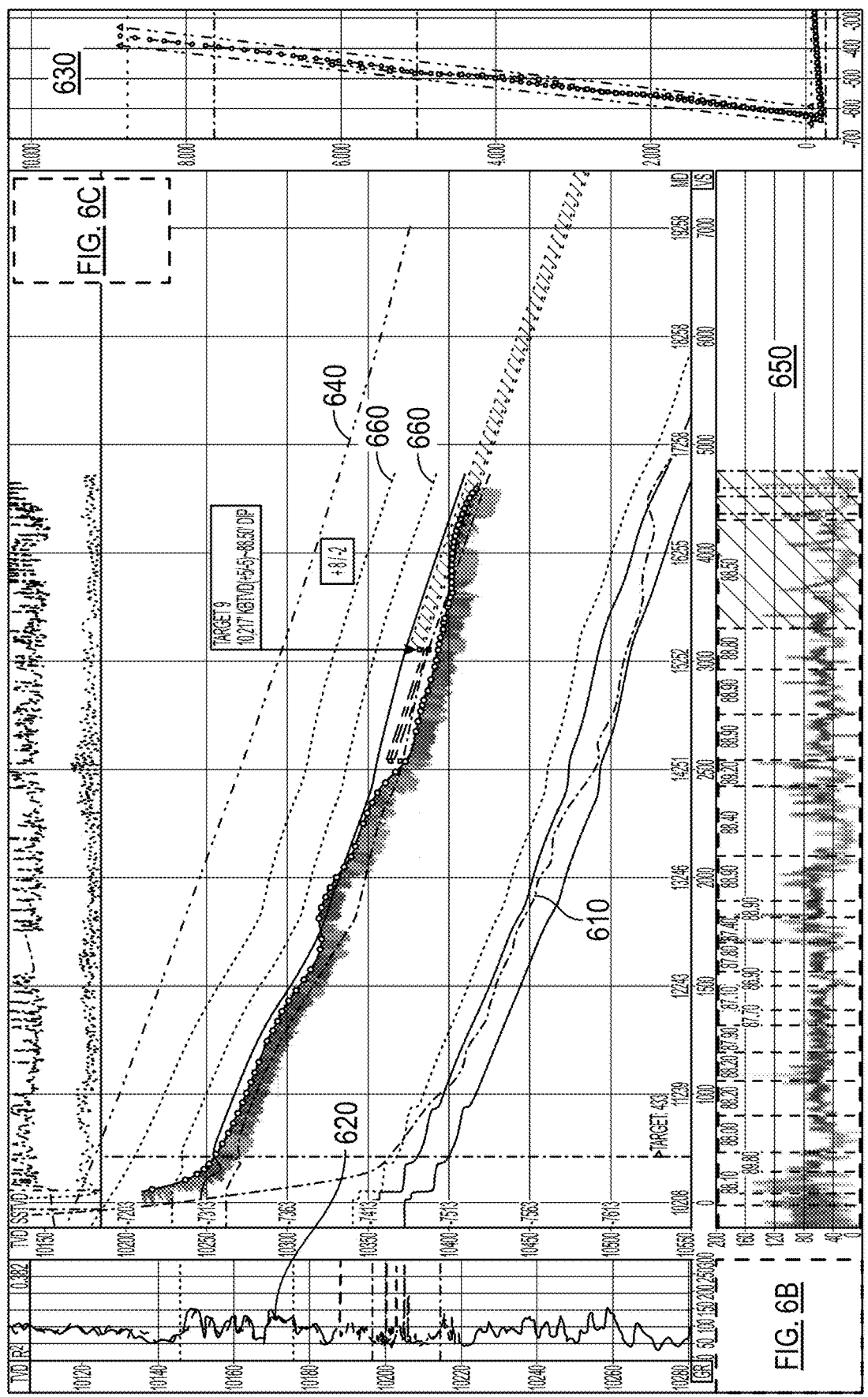

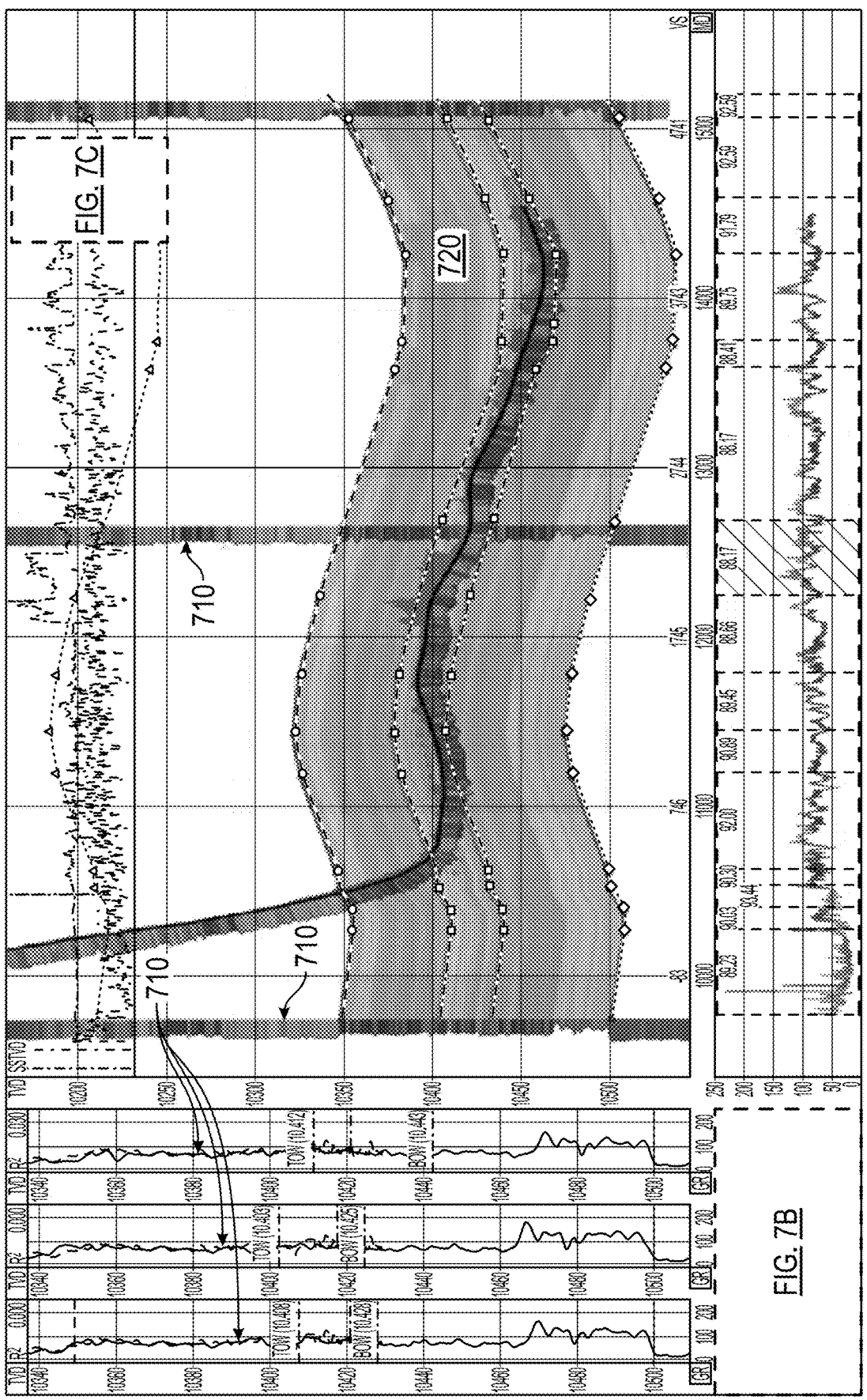

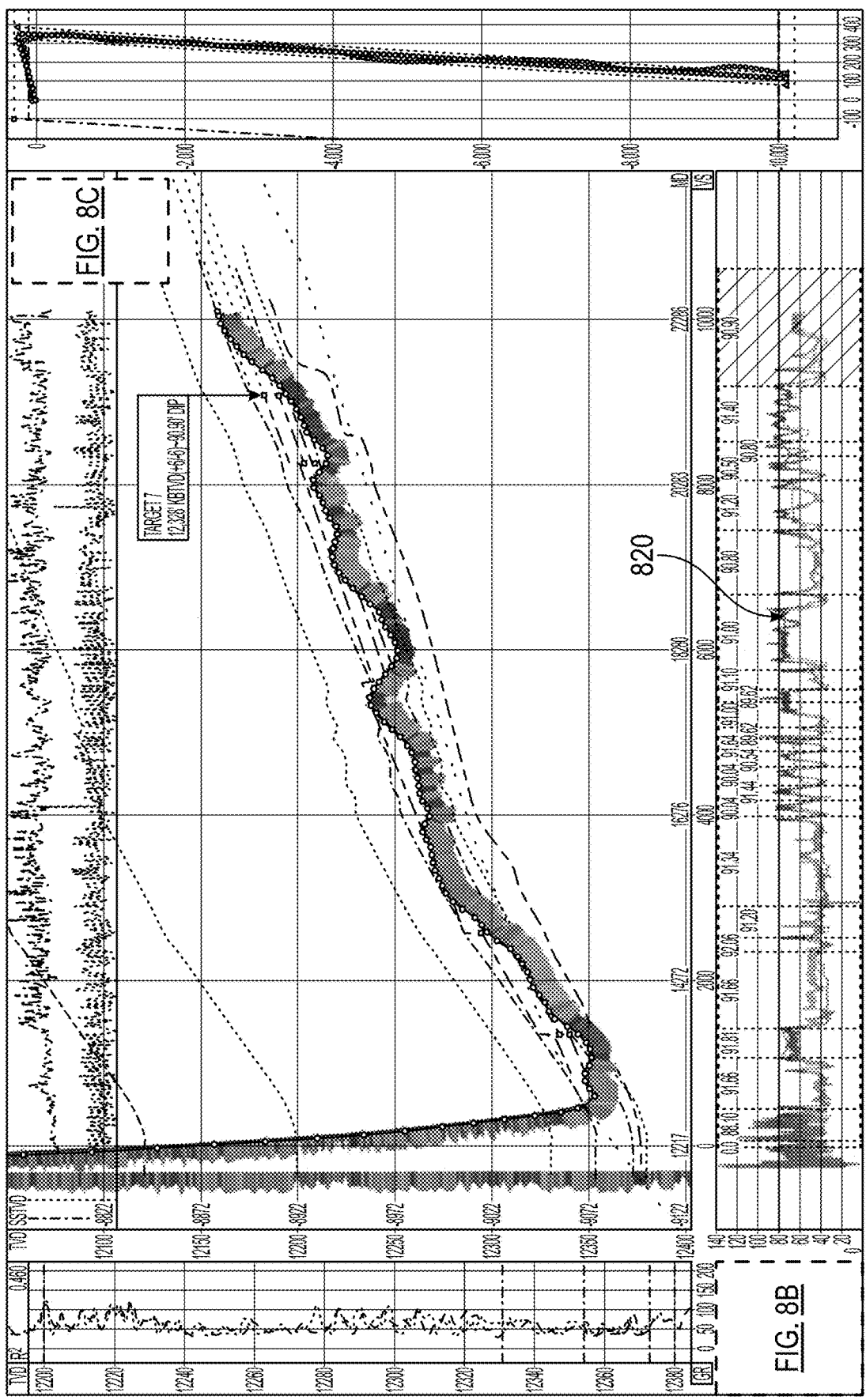

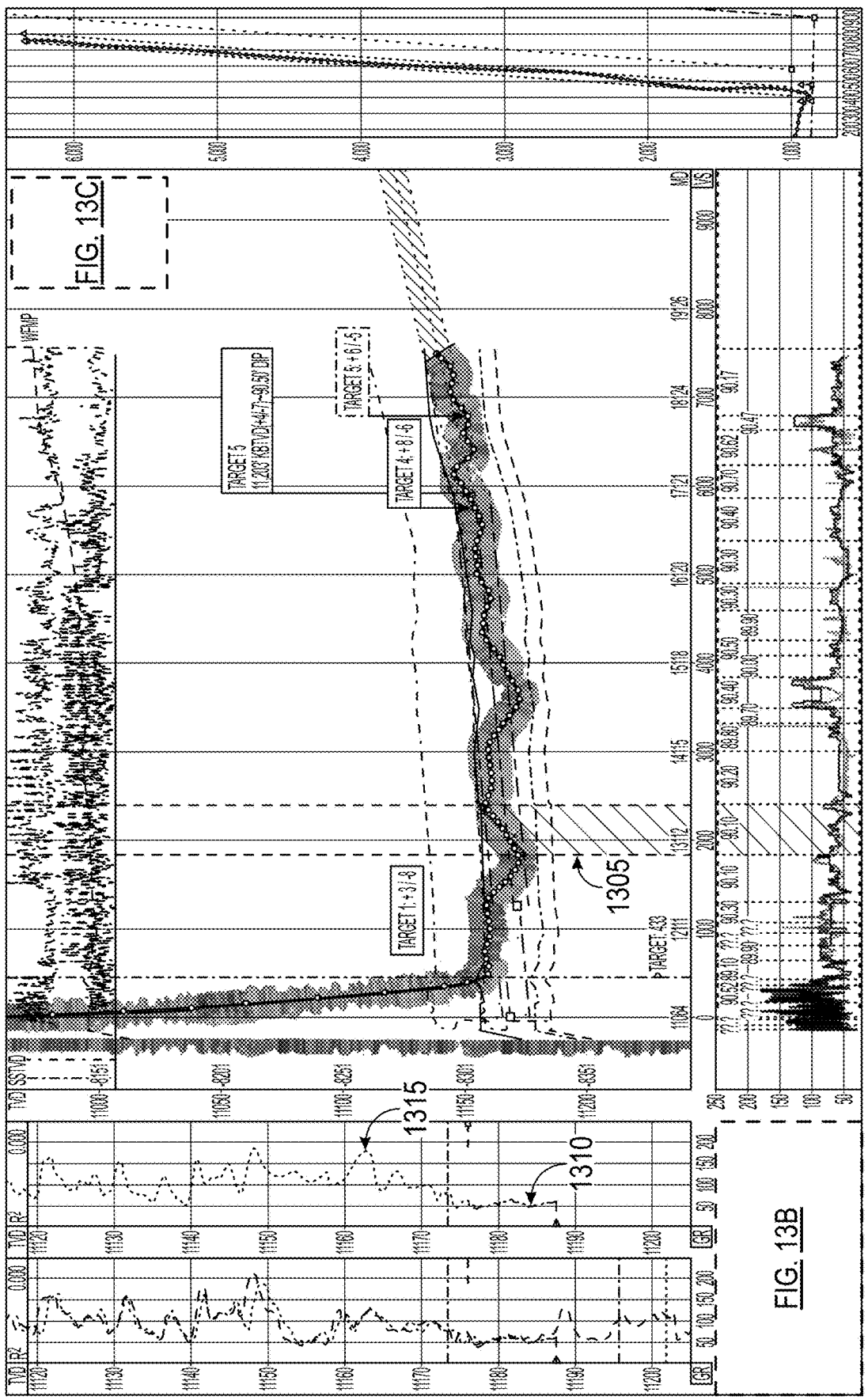

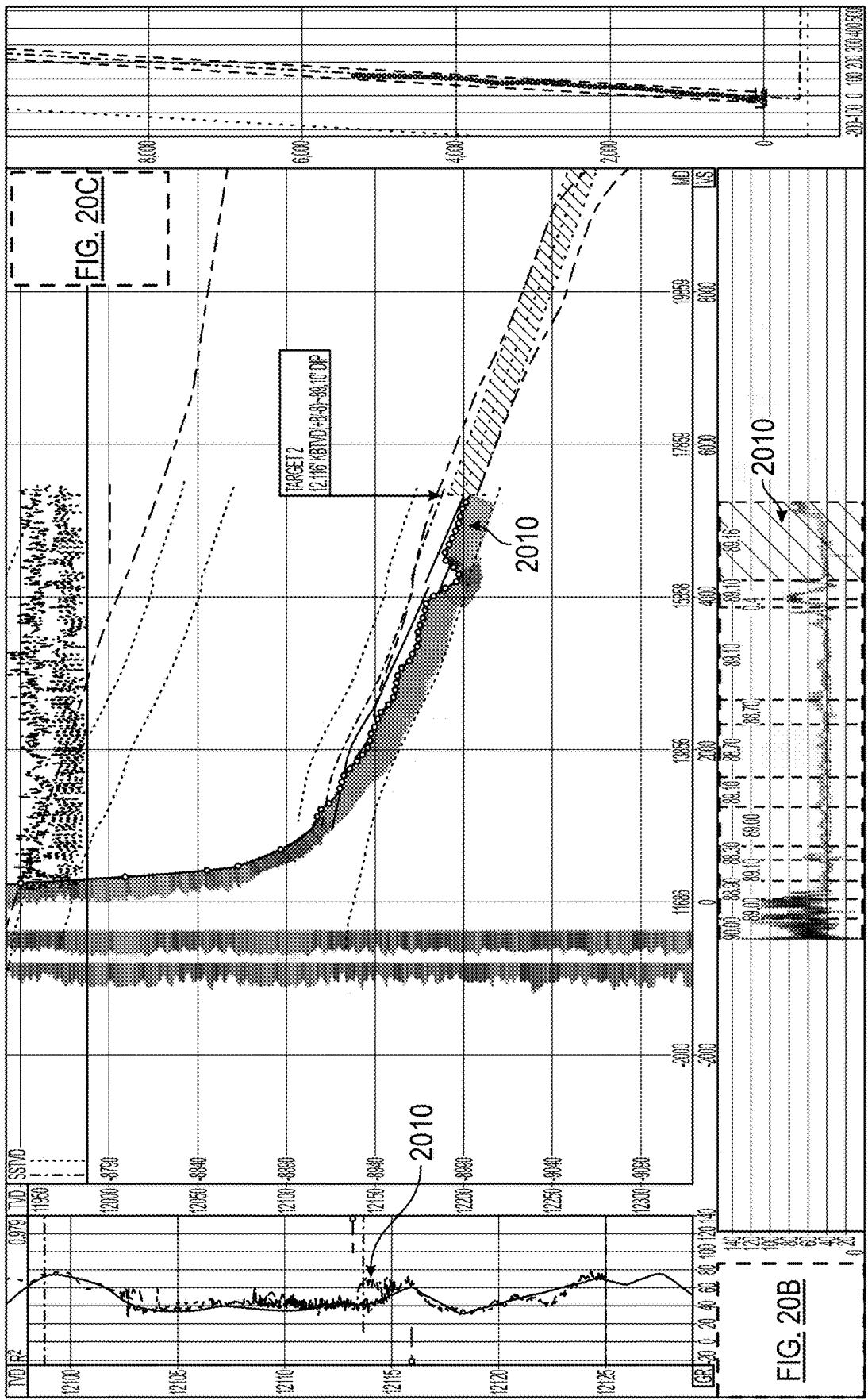

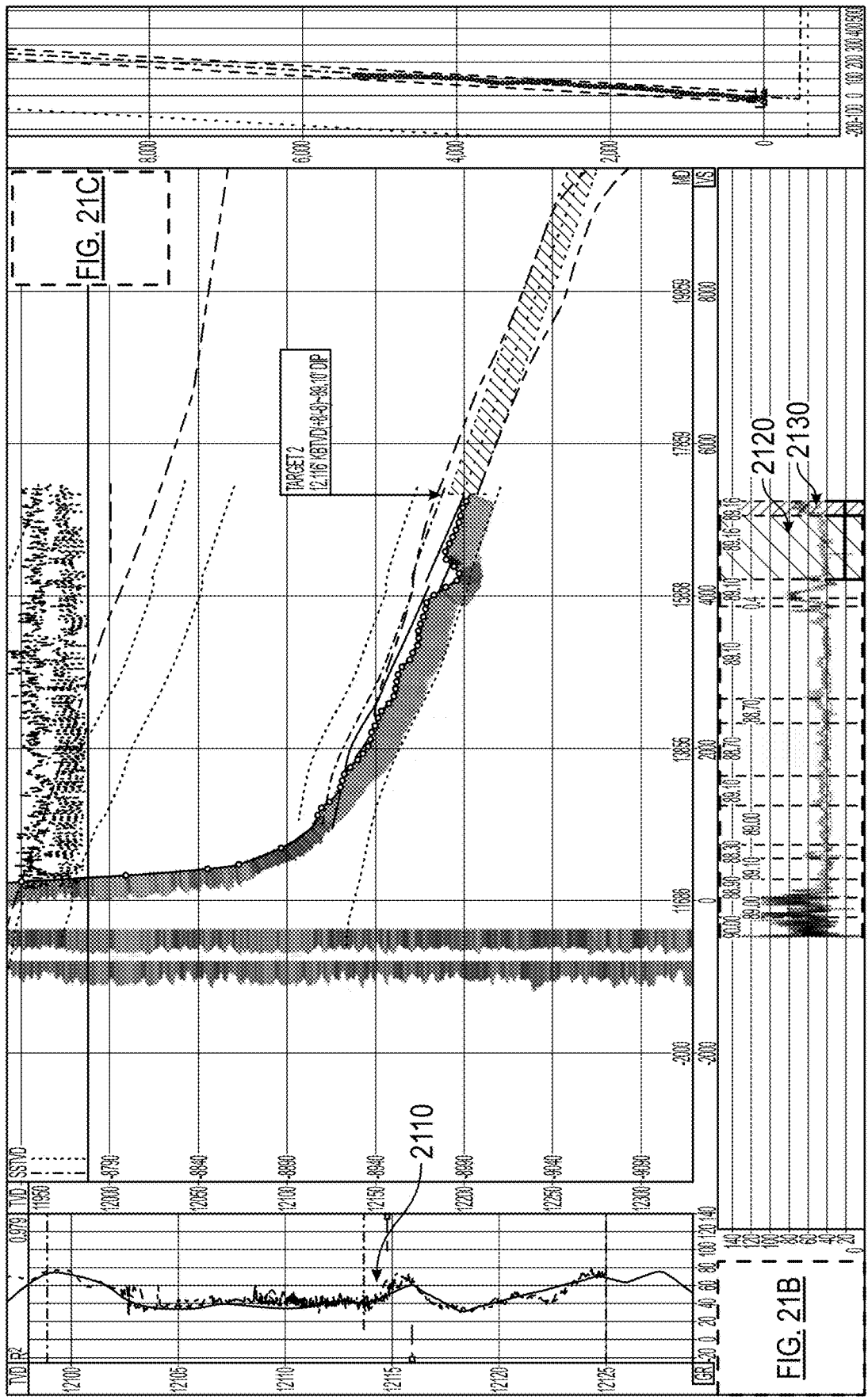

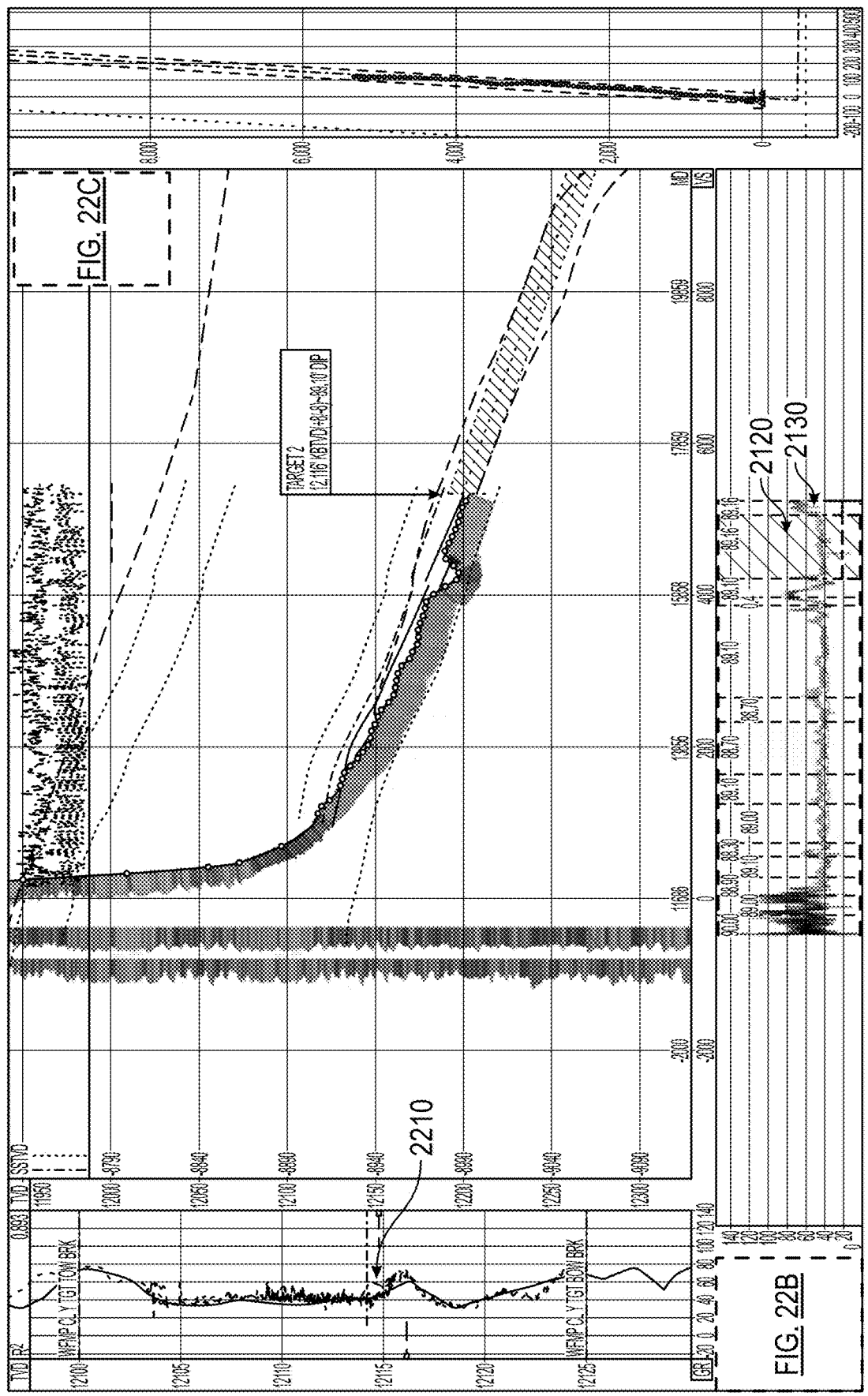

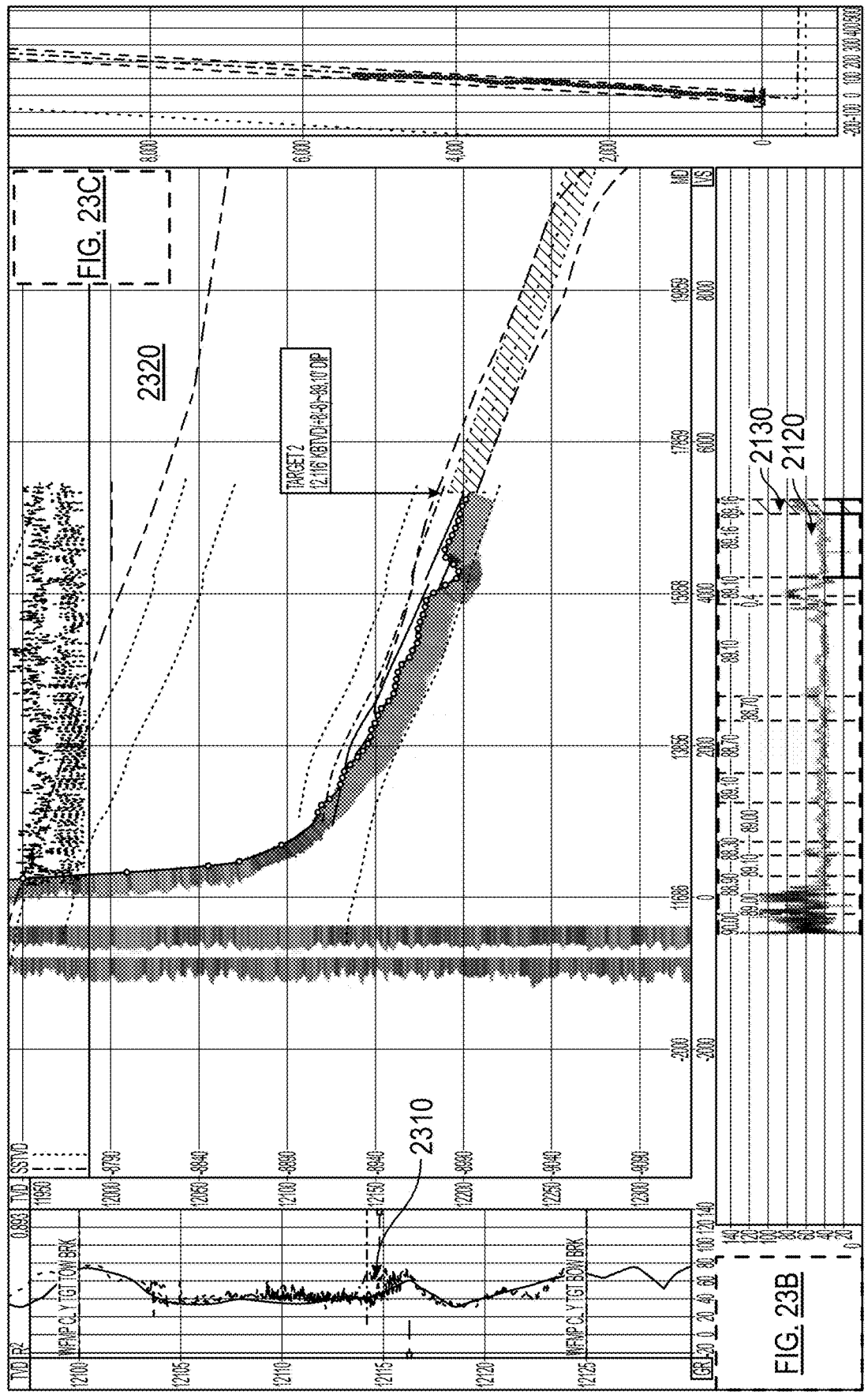

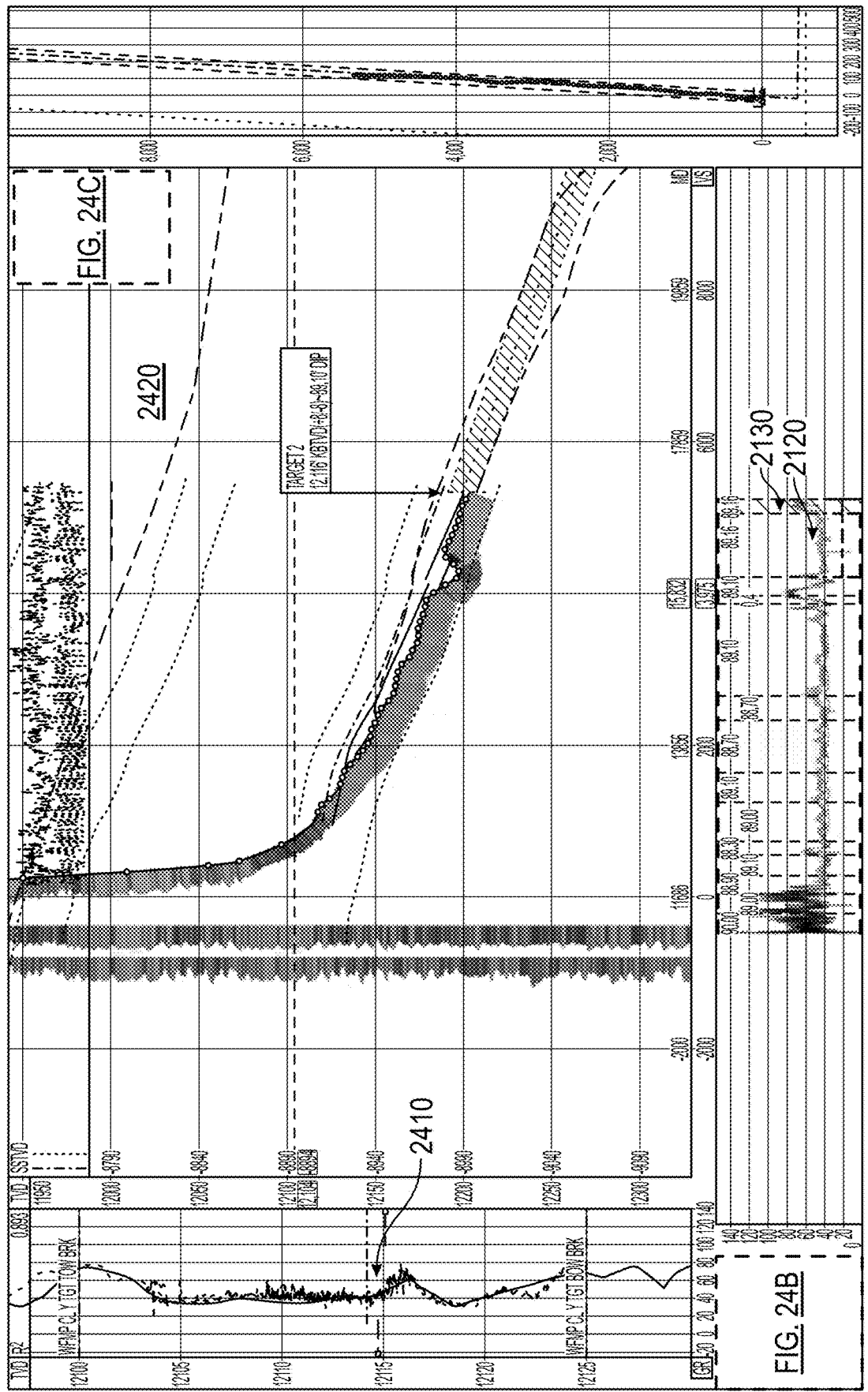

PRECISION TARGETING WITH SIMULATED WELL LOGS

CROSS-REFERENCE TO RELATED APPLICATIONS

This application claims priority to Provisional Application Ser. No. 62/745,097 filed Oct. 12, 2018. The contents of the provisional application are incorporated by reference.

BACKGROUND

Hydrocarbons, such as oil and gas, and other fluids are commonly obtained from subterranean formations that may be located onshore or offshore. The development of subterranean operations and the processes involved in removing hydrocarbons from a subterranean formation typically involve a number of different steps such as, for example, drilling a wellbore at a desired well site, treating the wellbore to optimize production of hydrocarbons, and performing the necessary steps to produce and process the hydrocarbons from the subterranean formation.

When performing subterranean operations, such as drilling a subterranean formation, it is often desirable to monitor and control the drilling operation to best place the wellbore for subsequent completion operations and fluid recovery.

BRIEF DESCRIPTION OF THE DRAWINGS

FIGS. 6A-6C, 7A-7C, 8A-8C, 9A and 9B, and 10A and 10B are example screen shots of an application for monitoring and controlling drilling operations according to embodiments of the present disclosure.

FIGS. 13A-13C are a graphical representation of a wellbore being drilled, and a calculated vertical well log based on a portion of MWD log measurements taken while drilling a horizontal portion of the well.

FIGS. 20A, 20B, 20C; 21A, 21B, 21C; 22A, 22B, 22C; 23A, 23B, 23C; and 24A, 24B, 24C are a set of screen shots of a application for monitoring and controlling a drilling operation that demonstrate a cell cutting operation.

Figure 1:
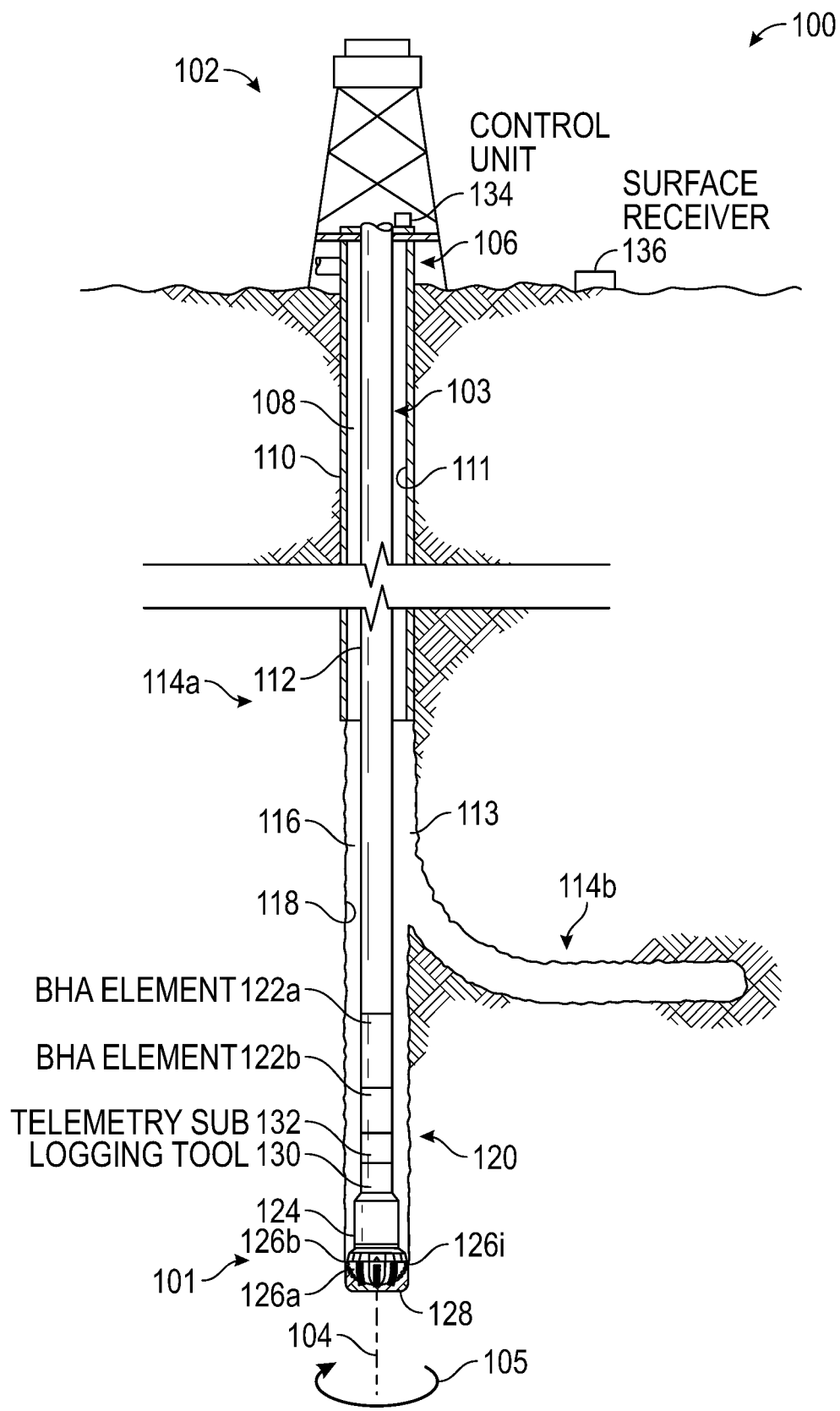
FIG. 1 illustrates an elevation view of an example embodiment of a drilling system used in an illustrative wellbore drilling environment, in accordance with some embodiments of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present invention, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. Devices and methods in accordance with certain embodiments may be used in one or more of wireline, measurement-while-drilling (MWD) and logging-while-drilling (LWD) operations. "Measurement-while-drilling" is the term generally used for measuring conditions downhole concerning the movement and location of the drilling assembly while the drilling continues. "Logging-while-drilling" is the term generally used for similar techniques that concentrate more on formation parameter measurement.

The terms "couple" or "couples," as used herein are intended to mean either an indirect or direct connection. Thus, if a first device couples to a second device, that connection may be through a direct connection, or through an indirect electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

The present disclosure includes methods, systems, and software to perform drilling operations in a subsurface formation. In general, an unconventional reservoir is one that will not produce significant amounts of fluid without an enhancement operation. Example unconventional reservoirs include shale formations.

FIG. 1 illustrates an elevation view of an example embodiment of drilling system 100 used in an illustrative logging-while-drilling (LWD) environment, in accordance with some embodiments of the present disclosure. Modern petroleum drilling and production operations use information relating to parameters and conditions downhole. Several methods exist for collecting downhole information during subterranean operations, including LWD and wireline logging. In LWD, data is typically collected during a drilling process, thereby avoiding any need to remove the drilling assembly to insert a wireline logging tool. LWD consequently allows an operator of a drilling system to make accurate real-time modifications or corrections to optimize performance while minimizing down time. In wireline logging, a logging tool may be suspended in the wellbore from a wireline and the logging tool may take measurements of the wellbore and subterranean formation.

Drilling system 100 may include well surface or well site 106. Various types of drilling equipment such as a rotary table, drilling fluid pumps and drilling fluid tanks (not expressly shown) may be located at well surface or well site 106. For example, well site 106 may include drilling rig 102 that may have various characteristics and features associated with a "land drilling rig." However, downhole drilling tools incorporating teachings of the present disclosure may be satisfactorily used with drilling equipment located on offshore platforms, drill ships, semi-submersibles and drilling barges (not expressly shown).

Drilling system 100 may also include drillstring 103 associated with drill bit 101 that may be used to form a wide variety of wellbores or bore holes such as generally vertical wellbore 114a or generally horizontal 114b wellbore or any other angle, curvature, or inclination. Various directional drilling techniques and associated components of bottom hole assembly (BHA) 120 of drillstring 103 may be used to form horizontal wellbore 114b. For example, lateral forces may be applied to BHA 120 proximate kickoff location 113 to form generally horizontal wellbore 114b extending from generally vertical wellbore 114a. The term "directional drilling" may be used to describe drilling a wellbore or portions of a wellbore that extend at a desired angle or angles relative to vertical. The desired angles may be greater than normal variations associated with vertical wellbores. Direction drilling may also be described as drilling a wellbore deviated from vertical. The term "horizontal drilling" may be used to include drilling in a direction approximately ninety degrees (90°) from vertical but may generally refer to any wellbore not drilled only vertically. "Uphole" may be used to refer to a portion of wellbore 114 that is closer to well surface 106 via the path of the wellbore 114. "Downhole" may be used to refer to a portion of wellbore 114 that is further from well surface 106 via the path of the wellbore 114.

Wellbore 114 may be defined in part by casing string 110 that may extend from well surface 106 to a selected downhole location. Portions of wellbore 114, as shown in FIG. 1, that do not include casing string 110 may be described as "open hole." Various types of drilling fluid may be pumped from well surface 106 through drillstring 103 to attached drill bit 101. The drilling fluids may be directed to flow from drillstring 103 to respective nozzles passing through rotary drill bit 101. The drilling fluid may be circulated back to well surface 106 through annulus 108 defined in part by outside diameter 112 of drillstring 103 and inside diameter 118 of wellbore 114. Inside diameter 118 may be referred to as the "sidewall" of wellbore 114. Annulus 108 may also be defined by outside diameter 112 of drillstring 103 and inside diameter 111 of casing string 110. Open hole annulus 116 may be defined as sidewall 118 and outside diameter 112.

BHA 120 may be formed from a wide variety of components configured to form wellbore 114. For example, components 122a, and 122b of BHA 120 may include, but are not limited to, drill bits (e.g., drill bit 101), coring bits, drill collars, rotary steering tools, directional drilling tools, downhole drilling motors, reamers, hole enlargers or stabilizers. The number and types of components 122 included in BHA 120 may depend on anticipated downhole drilling conditions and the type of wellbore that will be formed by drillstring 103 and rotary drill bit 101. BHA 120 may also include various types of well logging tools and other downhole tools associated with directional drilling of a wellbore. Examples of logging tools and/or directional drilling tools may include, but are not limited to, acoustic, neutron, gamma ray, density, photoelectric, nuclear magnetic resonance, induction, resistivity, caliper, coring, seismic, rotary steering and/or any other commercially available well tools. Further, BHA 120 may also include a rotary drive (not expressly shown) connected to components 122a, and 122b and which rotates at least part of drillstring 103 together with components 122a, and 122b.

In the illustrated embodiment, logging tool 130 may be integrated with BHA 120 near drill bit 101 (e.g., within a drilling collar, for example a thick-walled tubular that provides weight and rigidity to aid in the drilling process, or a mandrel). In certain embodiments, drilling system 100 may include control unit 134, positioned at the surface, in drillstring 103 (e.g., in BHA 120 and/or as part of logging tool 130) or both (e.g., a portion of the processing may occur downhole and a portion may occur at the surface). Control unit 134 may include a control system or a control algorithm for logging tool 130. Control unit 134 may be communicatively coupled to logging tool 130 and, in one or more embodiments, may be a component of logging tool 130.

MWD tool 130 may be integrated into drilling system 100 at any point along the drillstring 103. Multiple MWD tools 130 may be located along the length of the drillstring. MWD tool 130 may include one or more sensors. The sensors may include one or more measurement-while-drilling (MWD) tool sensors, such as strain gauges, accelerometers, and acoustic sensors. Other example sensors include one or more sensors to measure formation properties, such as acoustic, neutron, gamma ray, density, photoelectric, nuclear magnetic resonance, induction, resistivity, spontaneous potential, spectral gamma ray, azimuthal gamma rays, caliper, coring, or seismic sensors. Still other example sensors include one or more sensors to measure fluid properties, such as one or more of fluid flow rate or density. Each of the sensors produces an output indicative of the property measured by the sensor. MWD tool 130 may further include processor to operate the one or more sensor and to receive the outputs from the sensors.

Telemetry sub 132 may be included on drillstring 103 to transfer measurements to surface receiver 136 and/or to receive commands from control unit 134 (when control unit 134 is at least partially located on the surface). Telemetry sub 132 may transmit downhole data to a surface receiver 30 and/or receive commands from the surface receiver 30. Telemetry sub 132 may transmit data through one or more wired or wireless communications channels (e.g., wired pipe or electromagnetic propagation). Alternatively, telemetry sub 132 may transmit data as a series of pressure pulses or modulations within a flow of drilling fluid (e.g., mud-pulse or mud-siren telemetry), or as a series of acoustic pulses that propagate to the surface through a medium, such as the drillstring. Drilling system 100 may also include facilities (not expressly shown) that include computing equipment configured to collect, process, and/or store the measurements received from sensors on logging tool 130, and/or surface receiver 136, or from sensors at other locations along the drillstring. The facilities may be located onsite at the wellbore or offsite at a location away from the wellbore.

Drilling system 100 may also include rotary drill bit ("drill bit") 101. Drill bit 101 may include one or more blades 126 that may be disposed outwardly from exterior portions of rotary bit body 124 of drill bit 101. Blades 126 may be any suitable type of projections extending outwardly from rotary bit body 124. Drill bit 101 may rotate with respect to bit rotational axis 104 in a direction defined by directional arrow 105. Blades 126 may include one or more cutting elements 128 disposed outwardly from exterior portions of each blade 126. Blades 126 may also include one or more depth of cut controllers (not expressly shown) configured to control the depth of cut of cutting elements 128. Blades 126 may further include one or more gage pads (not expressly shown) disposed on blades 126. Drill bit 101 may be designed and formed in accordance with teachings of the present disclosure and may have many different designs, configurations, and/or dimensions according to the particular application of drill bit 101.

Figure 2:
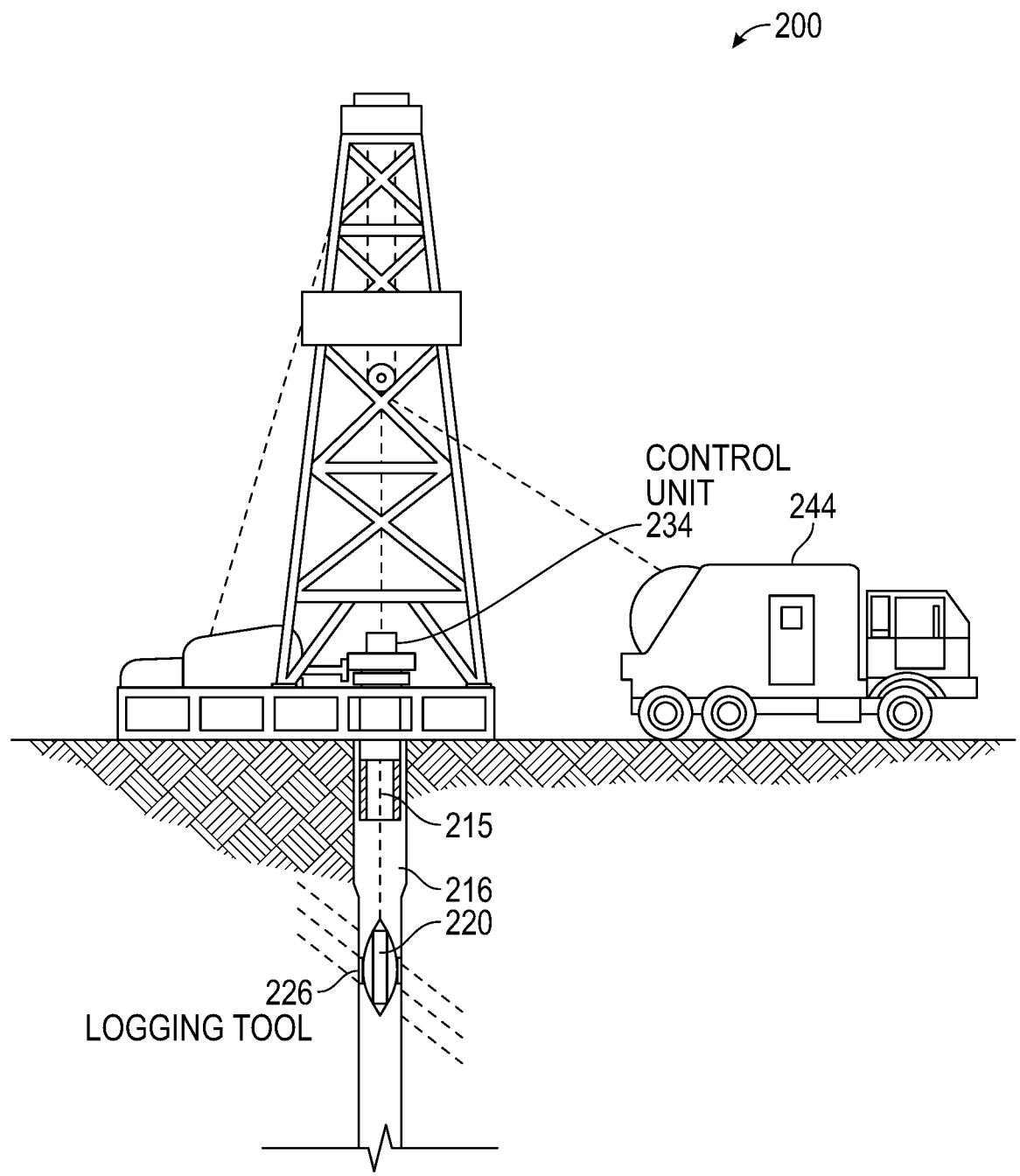
FIG. 2 illustrates an elevation view of an example embodiment of a downhole system used in an illustrative logging environment with the drillstring removed, in accordance with some embodiments of the present disclosure.

At various times during the drilling process, drillstring 103 may be removed from wellbore 114 and a wellbore logging tool may be used to obtain information about the subterranean formation. FIG. 2 illustrates an elevation view of an example embodiment of drilling system 200 used in an illustrative logging environment with the drillstring removed, in accordance with some embodiments of the present disclosure. Subterranean operations may be conducted using wireline system 220 once the drillstring has been removed, though, at times, some or all of the drillstring may remain in wellbore 114 during logging with wireline system 220. Wireline system 220 may include one or more logging tools 226 that may be suspended in wellbore 216 by conveyance 215 (e.g., a cable, slickline, or coiled tubing). Logging tool 226 may be similar to logging tool 130, as described with reference to FIG. 1. Logging tool 226 may be communicatively coupled to conveyance 215. Conveyance 215 may contain conductors for transporting power to wireline system 220 and telemetry from logging tool 226 to logging facility 244. Alternatively, conveyance 215 may lack a conductor, as is often the case using slickline or coiled tubing, and wireline system 220 may contain a control unit similar to control unit 134, shown in FIG. 1, that contains memory, one or more batteries, and/or one or more processors for performing operations and storing measurements. In certain embodiments, system 200 may include control unit 234, positioned at the surface, in the wellbore (e.g., in conveyance 215 and/or as part of logging tool 226) or both (e.g., a portion of the processing may occur downhole and a portion may occur at the surface). Control unit 234 may include a control system or a control algorithm. In certain embodiments, a control system, an algorithm, or a set of machine-readable instructions may cause control unit 234 to generate and provide an input signal to one or more elements of drillstring 103, such as the sensors along the drillstring 103. The input signal may cause the sensors to be active or to output signals indicative of sensed properties. Logging facility 244 (shown in FIG. 2 as a truck, although it may be any other structure) may collect measurements from logging tool 226, and may include computing facilities for controlling, processing, or storing the measurements gathered by logging tool 226. The computing facilities may be communicatively coupled to logging tool 226 by way of conveyance 215 and may operate similarly to control unit 134 and/or surface receiver 136, as shown in FIG. 1. In certain example embodiments, control unit 234, which may be located in logging tool 226, may perform one or more functions of the computing facility. An example of a computing facility is described with more detail with reference to FIG. 3.

Figure 3:
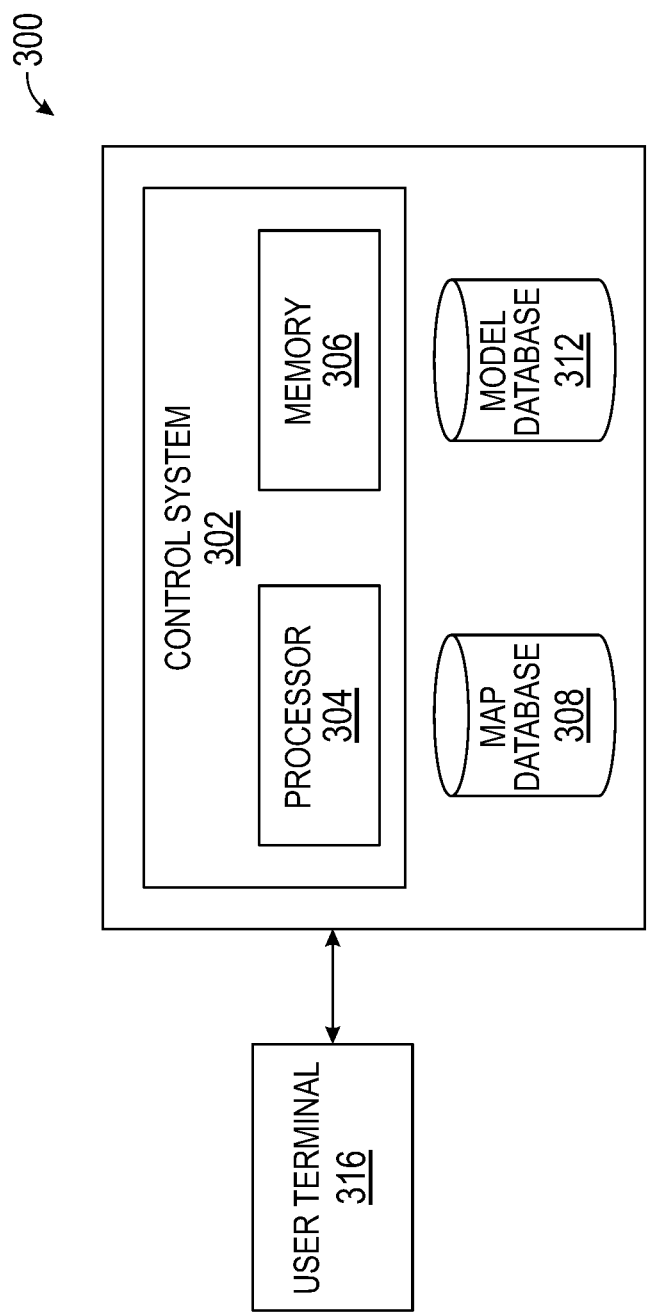
FIG. 3 illustrates a block diagram of an exemplary control system of the present disclosure.

FIG. 3 illustrates a block diagram of an exemplary control unit 300 in accordance with some embodiments of the present disclosure. In certain example embodiments, control unit 300 may be configured to create and maintain a map database 308 that includes one or more of a geological model of a region of interest, a geophysical model of the region of interest, a hydrological model of a region of interest. Other example models of the region of interest may model land, pipelines, or facilities. In other embodiments the control unit is configured to create and maintain a well database 312 with information concerning wells in the region of interest. As will be discussed in detail below, certain of the wells may be vertical well and others may be "unconventional" wells with one more horizontal or deviated segments. In other example embodiments, control unit 300 may be configured to control the operation of one or more sensors along drillstring 103 during a drilling operation or another downhole operation. In some embodiments, control unit 300 may include control system 302. Control system 302 may include any suitable components. For example, in some embodiments, control system 302 may include one more processors, such as processor 304. Processor 304 may include, for example a microprocessor, microcontroller, digital signal processor (DSP), application specific integrated circuit (ASIC), or any other digital or analog circuitry configured to interpret and/or execute program instructions and/or process data. In some embodiments, processor 304 may be communicatively coupled to memory 306. Processor 304 may be configured to interpret and/or execute non-transitory program instructions and/or data stored in memory 306. Program instructions or data may constitute portions of software for carrying out a drilling operation in a subterranean formation, as described herein. Memory 306 may include any system, device, or apparatus configured to hold and/or house one or more memory modules; for example, memory 306 may include read-only memory, random access memory, solid state memory, or disk-based memory. Each memory module may include any system, device or apparatus configured to retain program instructions and/or data for a period of time (e.g., computer-readable non-transitory media).

Control unit 300 may further include map database 308. Map database 308 may be communicatively coupled to sensor control system 302 and may provide information and models concerning one more or more of the geology, geophysics, and hydrology of a region of interest. Certain example embodiments include seismic survey information for a region of interest. Other example embodiments include gravity survey information for a region of interest. Other example embodiments include one or more of three-dimensional surveys, land grids, pipeline mapping, or facilities mappings for the region of interest. Map database 308 may be implemented in any suitable manner, such as by functions, instructions, logic, or code, and may be stored in, for example, a relational database, file, application programming interface, library, shared library, record, data structure, service, software-as-service, or any other suitable mechanism. Map database 308 may include code for controlling its operation such as functions, instructions, or logic. Map database 308 may specify any suitable properties of the drillstring, borehole, or subsurface formation that may be used to determine properties of the region of interest.

Control unit 300 may further include well database 308. Well database 308 may be communicatively coupled to sensor control system 302 and may provide information and models concerning one more or more properties of each well in a region of interest. In certain example embodiments, well database 308 includes gamma logs for wells in a region of interest. Other embodiments may include SP or resistivity logs for well. Map database 308 may be implemented in any suitable manner, such as by functions, instructions, logic, or code, and may be stored in, for example, a relational database, file, application programming interface, library, shared library, record, data structure, service, software-as-service, or any other suitable mechanism. Map database 308 may include code for controlling its operation such as functions, instructions, or logic. Map database 308 may specify any suitable properties of the drillstring, borehole, or subsurface formation that may be used to determine properties of the region of interest.

Although control unit 300 is illustrated as including two databases, control unit 300 may contain any suitable number of databases.

In some embodiments, control system 302 may be configured to generate signals to control drilling or completion operations. In certain example embodiments, control system 302 may be configured to make such a determination based on one or more instances of prior well database 308, and/or one or more instances of model database 312. Values from prior well database 308, and/or model database 312 may be stored in memory 306. Control system 302 may be further configured to cause processor 304 to execute program instructions operable Control unit 300 may be communicatively coupled to one or more displays 316 such that information processed by sensor control system 302 may be conveyed to operators of drilling and logging equipment at the wellsite or may be displayed at a location offsite.

Modifications, additions, or omissions may be made to FIG. 3 without departing from the scope of the present disclosure. For example, FIG. 3 shows a particular configuration of components for control unit 300. However, any suitable configurations of components may be used. For example, components of control unit 300 may be implemented either as physical or logical components. Furthermore, in some embodiments, functionality associated with components of control unit 300 may be implemented in special purpose circuits or components. In other embodiments, functionality associated with components of control unit 300 may be implemented in a general purpose circuit or components of a general purpose circuit. For example, components of control unit 300 may be implemented by computer program instructions. Control unit 300 or components thereof can be located at the surface, downhole (e.g., in the BHA and/or in the logging tool), or some combination of both locations (e.g., certain components could be disposed at the surface and certain components could be disposed downhole, where the surface components are communicatively coupled to the downhole components).

Figure 4:
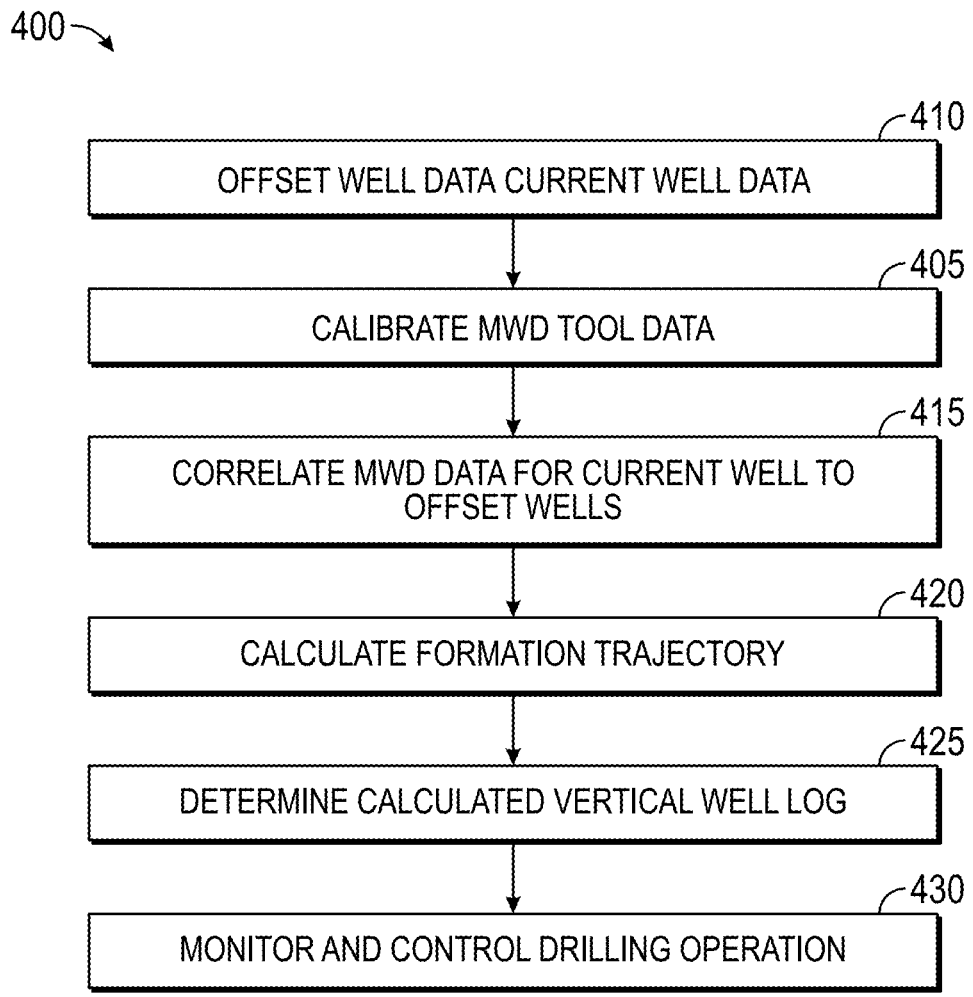
FIGS. 4 and 5 are block diagram of an exemplary drilling monitoring operation of the present disclosure.

FIG. 4 is a flow chart illustrating an example method of monitoring and controlling a drilling operation. In certain example embodiments, the method 400 is performed in whole or in part by user terminal 316, which is coupled to control unit 300. In certain example embodiments, user terminal 316 is a desktop computer, a laptop computer, a tablet, a PDA, or another device. In certain example embodiments both of user terminal 316 and control unit 300 are located at a well site. In other example embodiments, control unit 300 is at a central location while user terminal 316 is located at a well site.

In block 405, one or more of the terminal 316 and the control system 300 calibrate MWD tool data. Example data from the MWD tool includes the gamma log. In certain example embodiments, one or more of the terminal 316 and the control system 300 calibrates MWD tool data for the current well to log data for one or more offset wells using a curve matching algorithm.

Figure 12:
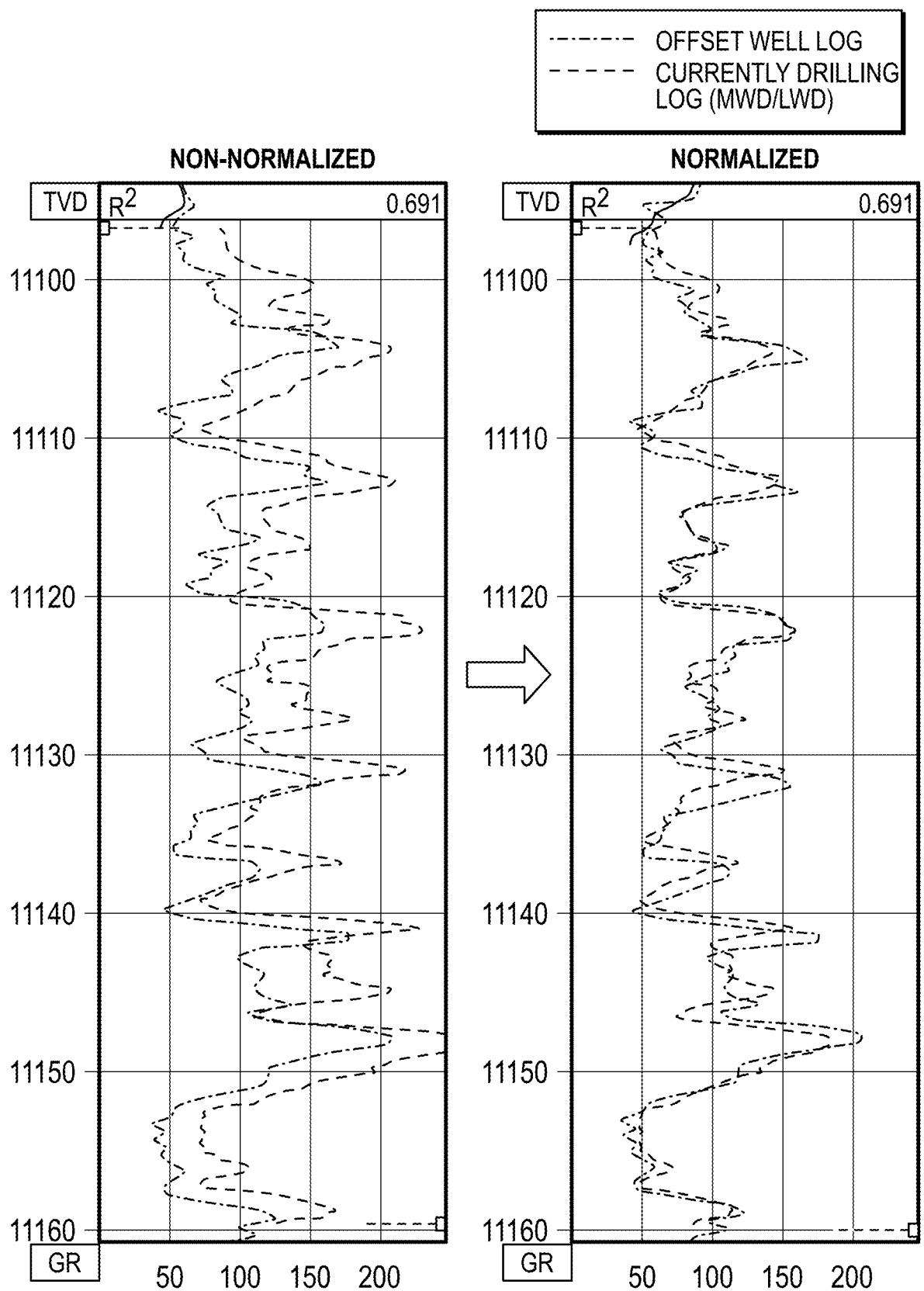
FIG. 12 is a graphical representation of a log normalization procedure.

In block 415, one or more of the terminal 316 and the control system 300 correlate the MWD tools data from the current well. One or more of the terminal 316 and the control system 300 determine a best-fit correlation of MWD log data to a known-well log data. In certain embodiments, the log data is gamma ray log. In certain example embodiments, the correlation is performed by manipulating the dip (stretch and squeeze MWD gamma ray data) and the Shift/Fault distance (bulk shift MWD Gamma Ray Data up or down in TVD Depth). FIG. 12 is a graphical representation of the process of block 15. In both the left and right hand portions, the green line represents a reading from the comparison well. In one example embodiment, the comparison well is an offset vertical well. In other example implementations, the comparison well is based on a simulated vertical well log that is based on all or a select portion of log readings from an offset horizontal well. As discussed below with respect to block 425, the simulated vertical well log may be referred to as a "stratigraphic curve" or "strat curve" in some example implementations. In one example embodiment, the correlation is performed by a linear process. An example equation for such a normalization is:

$$y=mx+b$$

where y is the resulting normalized log value, m is a multiplier repressing an increase or decrease variance of log data, x is the raw log value, and b is the data shift or the amount to add to or subtract from all raw log values. In certain implementations, the liner shift function is based on user input. The user may manually input the values from one or more of m and/or b. In other implementations, the user graphically manipulates the log and the software determines the corresponding changes to one more of m or b. In still other implementations, the control unit 300 or terminal 316 solves for one or more of m and/or b based on or more of dip, formation faults, calibration, and bulk shift. In still other implementations, other numerical techniques are used to correlate the MWD tools data from the current well.

In other implementations, normalization is performed by a process where the control unit 30, terminal, or the user defines a section on the offset well log (TVD top and TVD bottom) for normalization. In certain implementations, such a section may be chosen to have many value changes shown as many peaks and valleys. The user then defines a comparable range (user discretion to select the "same" log data range) section on the MWD/LWD (data from Drilling well) log (TVD top and TVD bottom) to be normalized. One or more of the terminal 316 and the control system 300 then calculates the mean and standard deviation of both selected portions of the log data (e.g., data from a log generated by one or more of acoustic, neutron, gamma ray, density, photoelectric, nuclear magnetic resonance, induction, resistivity, spontaneous potential, spectral gamma ray, azimuthal gamma rays, caliper, coring, or seismic sensors) and runs the following calculation:

$$\text{Log}_{NORM} = (\mu_1 - 2\sigma_1) + \left[\left(\frac{\sigma_1}{\sigma_2}\right)(\text{Log}_{MWD} - \mu_2 + 2\sigma_2)\right]$$

where $\mu_1$ is the mean of the selection portion of the Offset well log, $\mu_2$ is the mean of the selected portion of the MWD/LWD well log e.g., data from a log generated by one or more of acoustic, neutron, gamma ray, density, photoelectric, nuclear magnetic resonance, induction, resistivity, spontaneous potential, spectral gamma ray, azimuthal gamma rays, caliper, coring, or seismic sensors), $\sigma_1$ is the standard deviation of the selected portion of the offset well log, $\sigma_2$ is the Standard Deviation of the selected portion of the MWD/LWD well log, $\text{Log}_{NORM}$ is the Normalized MWD/LWD data point, and $\text{Log}_{MWD}$ is the MWD/LWD data point.

In block 420, one or more of the terminal 316 and the control system 300 calculates the formation trajectory. In certain example embodiments, this may involve the calculation of a Pseudo Type Gamma Ray Log. In certain example embodiments, one or more of the terminal 316 and the control system 300 calculates the formation trajectory to determine the vertical well Gamma Ray value. In certain example embodiments, the application creates a data stream that is available to plot in the Top, Bottom, or Wellbore (along the wellbore) charts.

In block 425, one or more of the terminal 316 and the control system 300 generates a calculated log profile for a calculated vertical well at the present wellsite, based on all or a portion of log data from a horizontal well. In certain example implementations, the includes log values for true vertical depth (TVD) values beyond the TVD of the well 120. In certain example implementations, the calculated log profile for a vertical well at the present wellsite is for a gamma log. In certain example implementations, the calculated log profile for a vertical well at the present wellsite is for an SP log. Other example logs are those generate by one or more of acoustic, neutron, gamma ray, density, photoelectric, nuclear magnetic resonance, induction, resistivity, spontaneous potential, spectral gamma ray, azimuthal gamma rays, caliper, coring, or seismic sensors. Other example logs are based on calculated log values, such as porosity or water saturation.

Figure 13B:
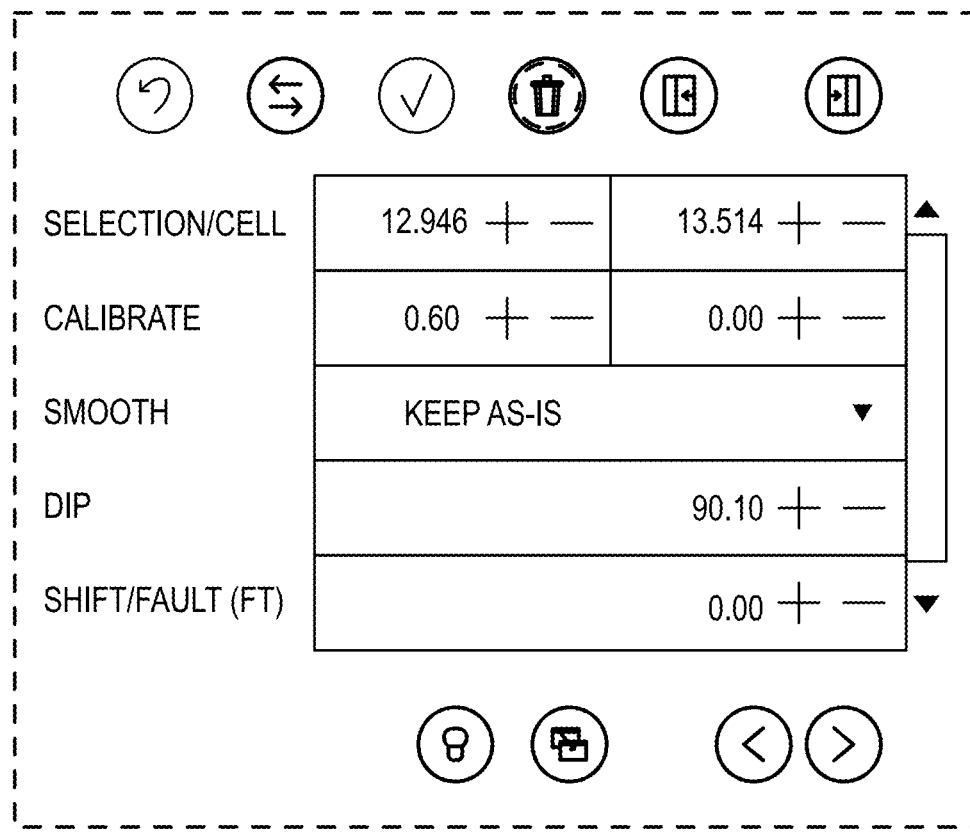
Figure 13C:
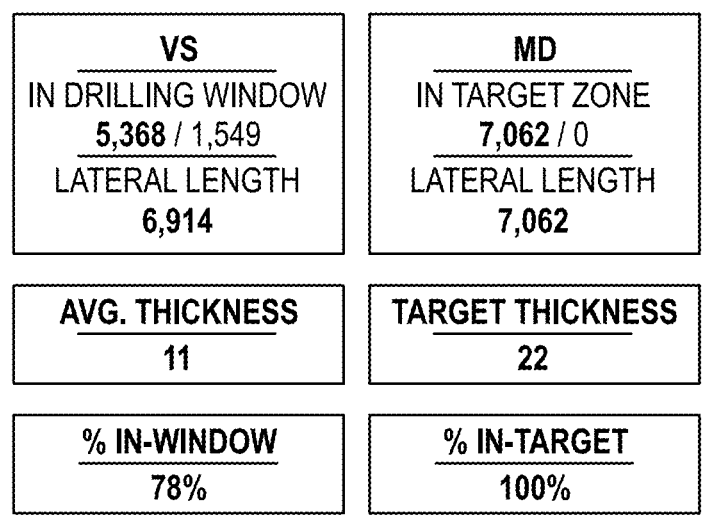

FIGS. 13A-13C show an example graphical representation of a calculated vertical well log at the present wellsite. A portion of the current wellbore is shown in the center section as a dotted black line. The portion of the current wellbore that is selected to create the calculated vertical well log is shown in the crosshatched region at 1305. The calculated vertical well log is shown by the lines 1310 and 1315 in the second pane from the left. The portion at 1310 represents the portion of the calculated vertical well log for the portion of the wellbore in the selected green portion. The portion at 1310 is the calculated vertical well log and the portion at 1315 is the MWD data plotted for the selected portion of the wellbore in comparison to the calculated vertical well log.

Figure 11:
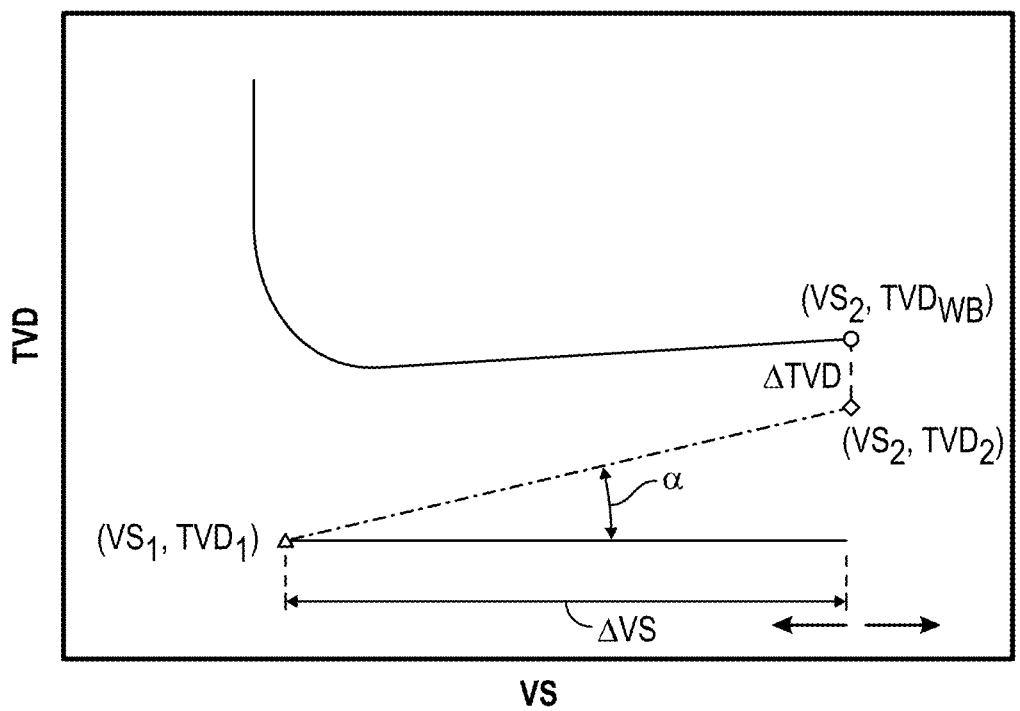
FIG. 11 is a graphical representation of calculating a TVD value for a given measured depth.

An example implementation of calculating the calculated vertical well log is shown graphically in FIG. 11. The example covers one point ($VS_1$, $TVD_1$) being held static, and a second point ($VS_2$, $TVD_2$) which will change based on one or more of the following:

Cell Size changes ($\Delta VS$) resulting in a different $VS_2$
Dip (Angle $\alpha$) changes resulting in a different $TVD_2$ Position When manipulating a chosen section of measured depths of the well (which is referred to as a "cell"), the angle $\alpha$ and $VS_2$ will change which will result in a change of $TVD_2$. Thus as a user changes the VS "size" of a cell, $TVD_2$ will change. Also, as a user changes the Dip (angle $\alpha$), $TVD_2$ will change.

$$TVD_2 = TVD_1 - [\tan(\alpha) \times (VS_2 - VS_1)]$$

The formula provided gives us a TVD position ($TVD_2$) of said formation which can then be used to find the delta from that exact TVD position ($TVD_2$) to the Wellbore at the same VS ($VS_2$).

$$\Delta TVD = TVD_2 - TVD_{WB}$$

Any Changes made to cell size ($\Delta VS$) or dip (Angle $\alpha$) this calculation runs for every data point between ($VS_1$, $TVD_1$) and ($VS_2$, $TVD_2$). The log measurements from the corresponding portion of the horizontal log are then plotted to the calculated TVD in the calculated vertical log.

In block 430, the terminal 316 and/or the control until 300 monitor and control a drilling operation. One or more offset wells or calculated vertical logs may be used to control a drilling operation in block 430. In certain example embodiments, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 offset well logs are used to control the drilling operation. Logs from offset well may be referred to as "type log" in some embodiments. In certain example embodiments, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 calculated vertical logs are used to control the drilling operation. One or more of the offset wells used in block 425 may be vertical wells where the TVD is close to measured depth (MD). In certain example embodiments, users of terminal 316 can pull in data from one or more offset vertical wells to compare and correlate their MWD data for the currently drilling well. In certain example embodiments, the data from the one or more offset vertical wells can be juxtaposed with a main wellbore view, the correlation tool used for landing or into a separate correlation window. One or more of the offset wells used in block 405 may have horizontal sections or deviated sections, such that TVD is not closely associated with MD for the entirety of the wellbore. In certain example embodiments, users the terminal use offset horizontal or deviated wells that have already been drilled for guidance and forward learning. In certain example implementations, the terminal 316 displays these wells and their interpreted formations in the same screen as the currently drilling well for direct comparison. In certain example embodiments, the log measurements are gamma log measurements. In certain example embodiments, the stratigraphic curve may indicate rock layers of interest in a subterranean formation. In certain example embodiments, the curve indicates the boundaries of shale deposits in the subterranean formation. The offset well considered in block 430 may be varying distances from the well currently being drilled.

As part of monitoring and controlling the drilling operation (block 430), the terminal 316 or control until 300 may provide one or more uses with an overhead "plat view" to a user. In certain example embodiments, the plat view is a top-down view of real-time survey data from drilling well with the wellbore plan, lease lines, hard lines, and a drilling box. The plat view may be used to keep users in the filed up-to-date on the trajectory of the well.

As part of monitoring and controlling the drilling operation (block 430), the terminal 316 or control until 300 may provide one or more uses with a "worm space" log display. In certain example embodiments, the type log data "smeared" or "spread" across the wellbore chart background that represents the earth via whatever data stream is being used. Example data streams that may be used for the "worm space" data include gamma ray logs showing "Gamma Space" and Reservoir Target showing "Best Target" Space.

As part of monitoring and controlling the drilling operation (block 430), the terminal 316 or control until 300 may calculate a percentage of a wellbore that is "In-Target," or "In-Window." In certain example embodiment, the "In-Target" percentage is an amount of a wellbore beyond predetermined distance that is between the top and base of a geologic zone. The predetermined distance may be input by a user. In certain example embodiments, the predetermined distance may be calculated based on data about the current or offset wells (block 410).

In certain example embodiments, the "In-Window" percentage is the amount of a wellbore beyond a predefined distance that is between the top and base of a projected drilling zone. The predefined distance for the "In-Window" percentage may be manually set by a drilling engineer or another person. In other example embodiments, the predefined distance for the "In-Window" percentage may be based, at least in part, on a data from the current well and one or more offset wells (block 410).

As part of monitoring and controlling the drilling operation (block 430), the terminal 316 or control until 300 may issue alerts. In certain example embodiments the alerts may be set to warn or inform users that some action or operation has started, ended, or needs attention. In certain example embodiments, alerts are issued directly to the user of terminal 316. In other example embodiments, alerts may be sent to user by MMS, SMS, pager, email, or as push notifications to a desktop or mobile device. In one example embodiment, the terminal 316 or control until 300 issue an alert that the wellbore is nearing target bounds. This alert may be issued, for example, when the wellbore is a predefined distance below the top of the window, or above the bottom of the window. In another example embodiment, the terminal 316 or control until 300 issue a wellbore out of target bounds when the wellbore is no longer within the desired window. In another example embodiment, the terminal 316 or control until 300 issues a new interpretation alert. Such an alert may be used to signal that a geosteerer has published an update from the terminal 316 that can be seen in other applications. In another example embodiment, the terminal 316 or control until 300 issues new target alert. Such an alert may signal that a geosteerer has published an update from the terminal 316 with new Target information that can be seen in another user application. In addition to alerts, in certain example embodiments, the terminal 316 or control until 300 issues up-to-date or live alerts to other users regarding data from the user terminal 316 or control unit 300.

Modifications, additions, or omissions may be made the method of FIG. 4 without departing from the scope of the present disclosure. For example, the order of the steps may be performed in a different manner than that described and some steps may be performed at the same time. Additionally, each individual step may include additional steps without departing from the scope of the present disclosure. In certain embodiments, one or more steps of FIG. 4 may be omitted. For example, during a drilling operation MWD tool data may be re-calibrated (block 405). Likewise, during a drilling operation the terminal 316 or control unit 300 may need to re-calculate formation trajectory (block 420). During a drilling operation the terminal 316 or control unit 300 may need to again correlate MWD data for current well to offset wells (block 415).

Figure 6B:
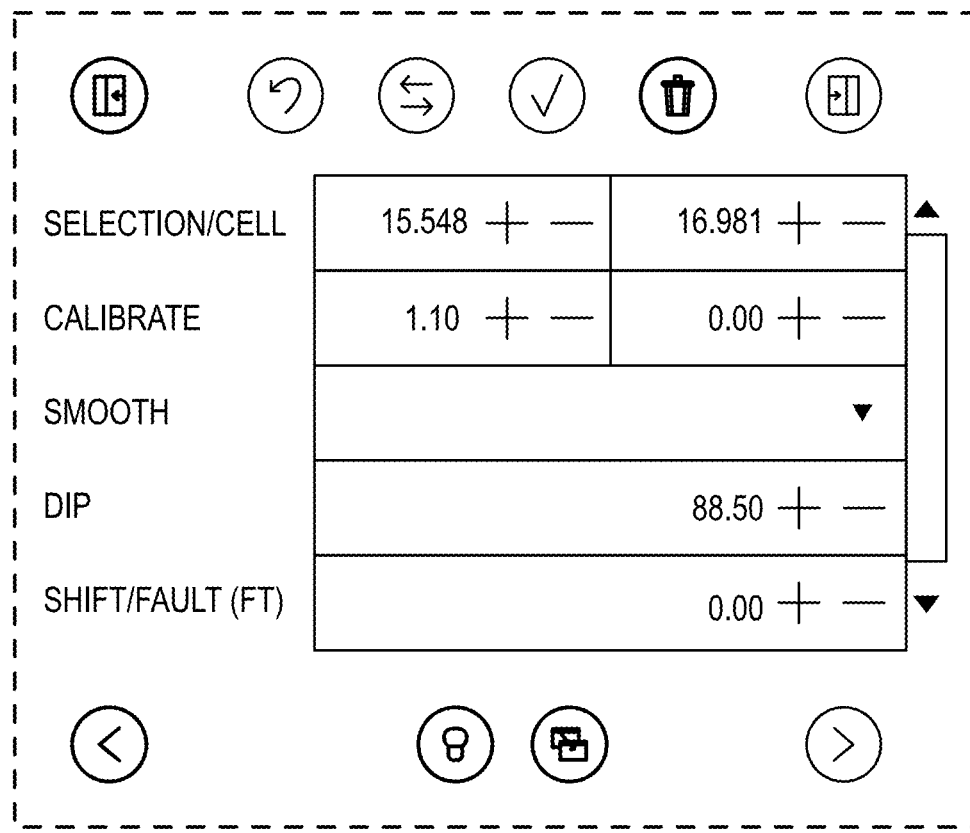
Figure 6C:
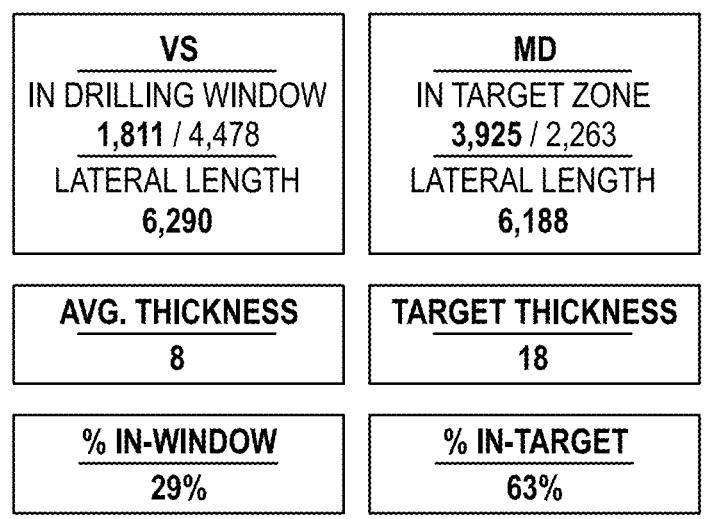

FIG. 6A is a screenshot of a user-interface of the present disclosure. It should be noted that in the screenshots in each of FIGS. 6A (6C), 7A (7C), 8A (8C), 9A, 10A, 13A (13C), 20A (20C), 21A (21C), 22A (22C), 23A (23C), and 24A (24C), the abbreviation "TVD" represents "True Vertical Depth"; the abbreviation "VS" represents "Vertical Section"; the abbreviation "MD" represents "Measured Depth"; and the abbreviation "GR" represents "Gamma Ray." Regarding FIG. 6A, further details of regions 6B and 6C are shown in details in FIGS. 6B and 6C, respectively. It should be noted that the details of FIGS. 6B, 7B, 8B, 9B, 10B, 13B, 20B, 21B, 22B, 23B, and 24B include interface icons at the top and bottom that may be selected by a user. In the center region is a plot of GR versus TVD. The curve 610 is an offset well of a formation previously steered using the application. The line 640 represents a formation from a structure map. The curve 620 in the left-hand plot is a calibrated MWD gamma to match a generated gamma curve. The region 630 is a plat view of the current well. The region 650 shows real-time data from a rig management application. The lines 660 are formation boundaries of the current well based on calculated log data to determine formation thicknesses.

Figure 7B:
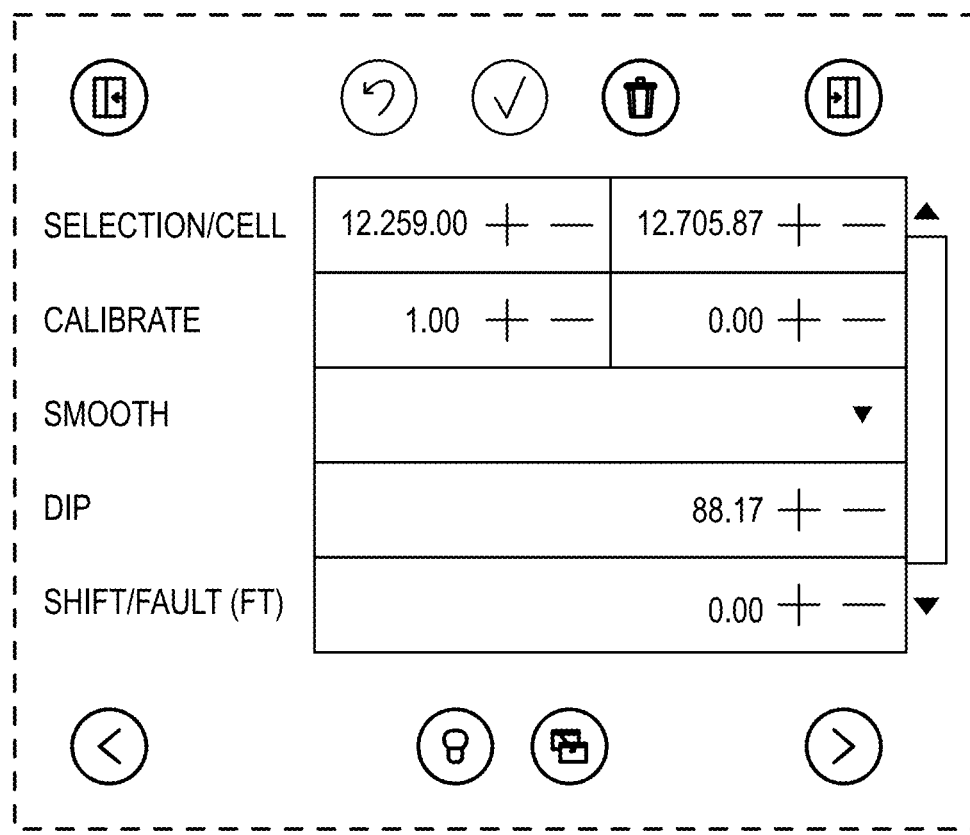
Figure 7C:
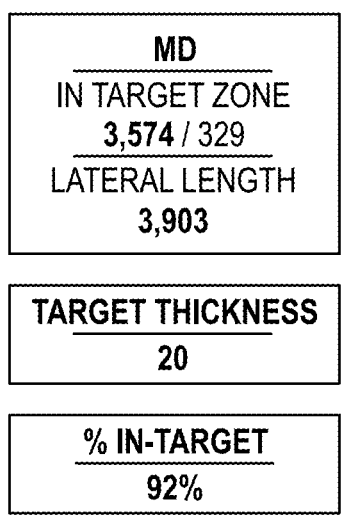

FIG. 7A is a screenshot of a user-interface of the present disclosure. Further details of regions 7B and 7C are shown in details in FIGS. 7B and 7C, respectively. As part of monitoring and controlling the drilling operation (block 430), the terminal 316 or control until 300 may provide one or more uses with a "worm space" log display. In certain example embodiments, the type log data "smeared" or "spread" across the wellbore chart background that represents the earth via whatever data stream is being used. This is shown by spread log data 720 in FIG. 7A. Offset well data 710 is shown both in the graphical display and the log display in the left-hand portion of the display. Example data streams that may be used for the "worm space" data include gamma ray logs showing "Gamma Space" and Reservoir Target showing "Best Target" Space.

Figure 8B:
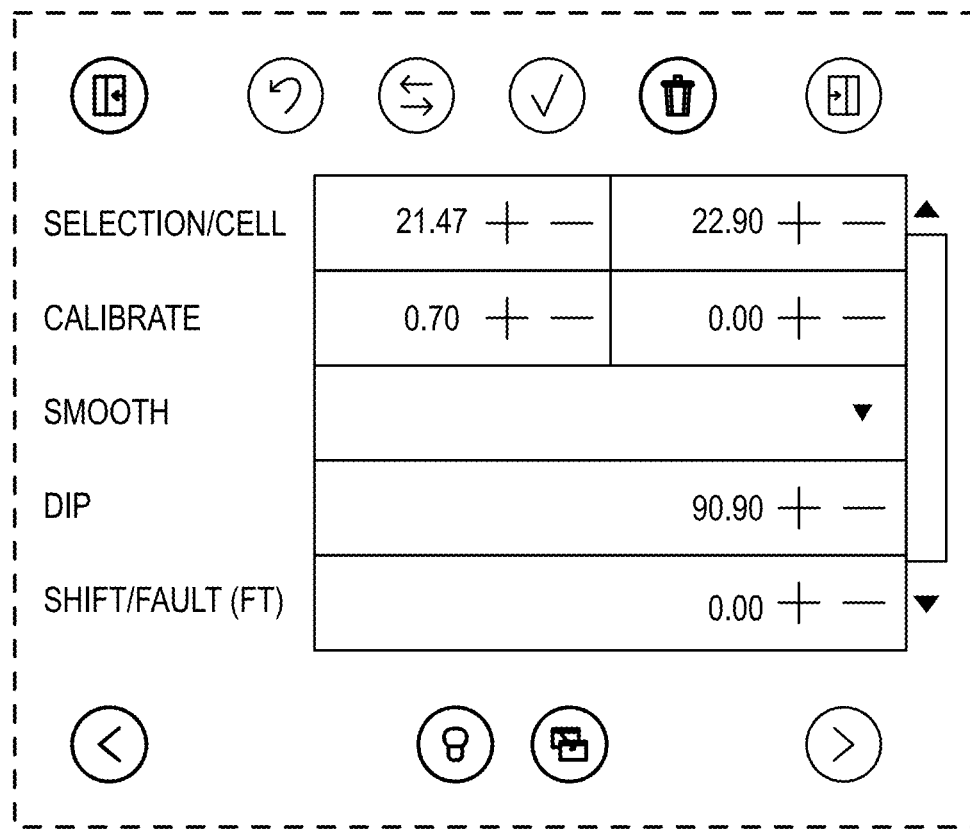
Figure 8C:
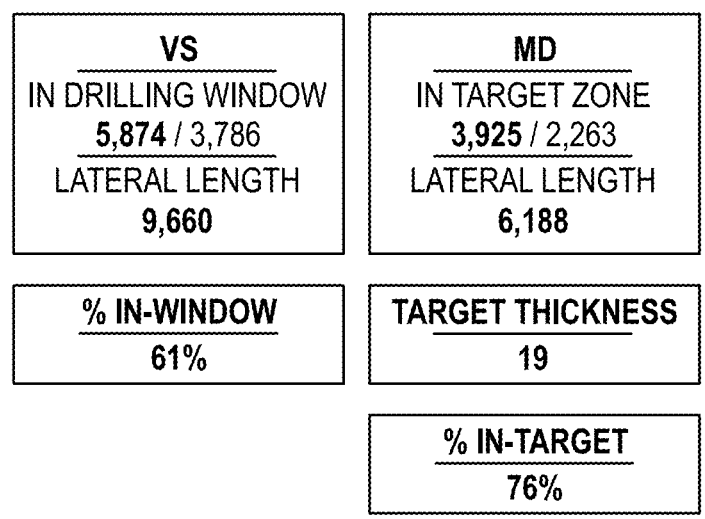

FIG. 8A is a screenshot of a user-interface of the present disclosure. Further details of regions 8B and 8C are shown in details in FIGS. 8B and 8C, respectively. In the lower panel, a calculated gamma log 820 is juxtaposed with actual gamma measurements from the current well. As shown in FIG. 8C, example user interfaces display calculations of the portion of Vertical Section ("VS") that is in the calculated drilling window as both an total in window/total drilled. In certain embodiments, the VS measurement represents the distance away from the vertical portion of the well. The VS may therefore represent the length of the lateral. The display further shows the average thickness of the drilled well as well as the target thickness. The display further shows the amount of measured depth ("MD") that is in the target zone and a percentage that is in-target and the lateral length. In certain example embodiments, the MD measurement is a direct measurement of the total length of the wellbore by the footage of pipe in the ground.

Figures 9A, 9B:
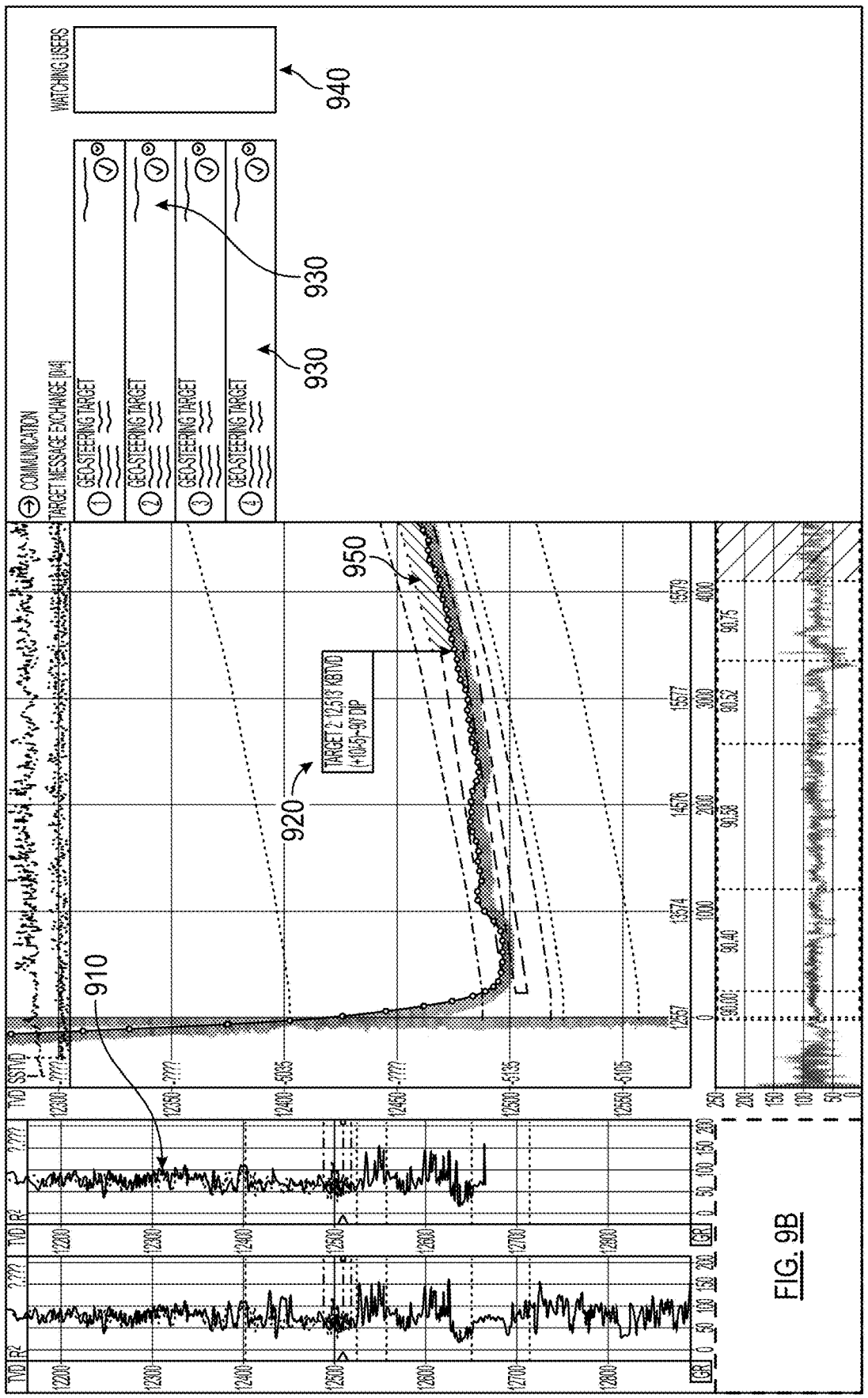
Figure 9B:
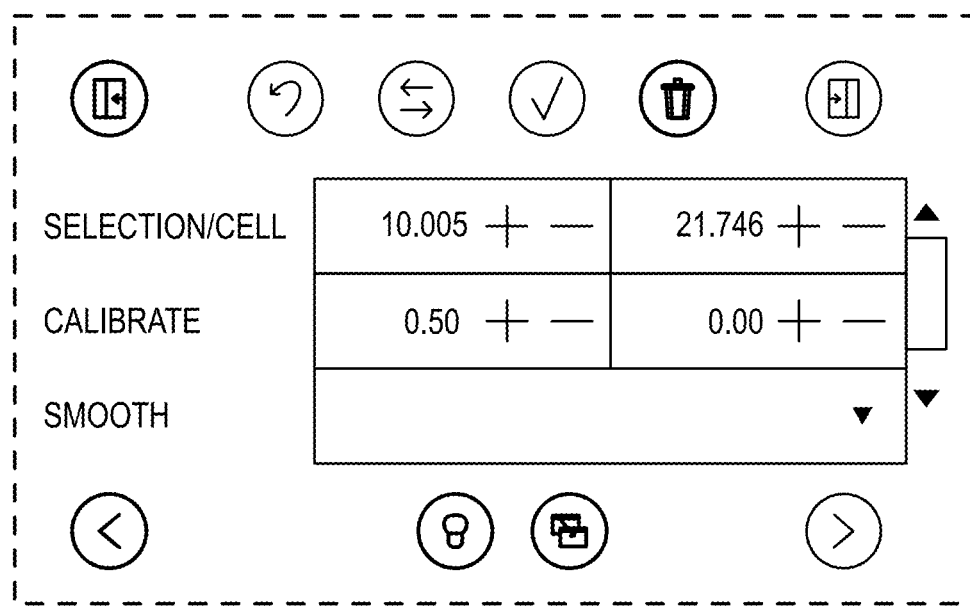

FIG. 9A is a screenshot of a user-interface of the present disclosure. Further details of region 9B is shown in detail in FIG. 9B. A calculated logs from nearby horizontal well is shown at 910. Target 920 and 950 are sent to other applications, such as a mobile or tablet-based drilling monitoring application. A checkmark indicates that the user has viewed the target. A listing of target messages to other users is shown at 930. A list of watching users 940 is displayed on the right-hand size of the user interface.

Figure 10A:
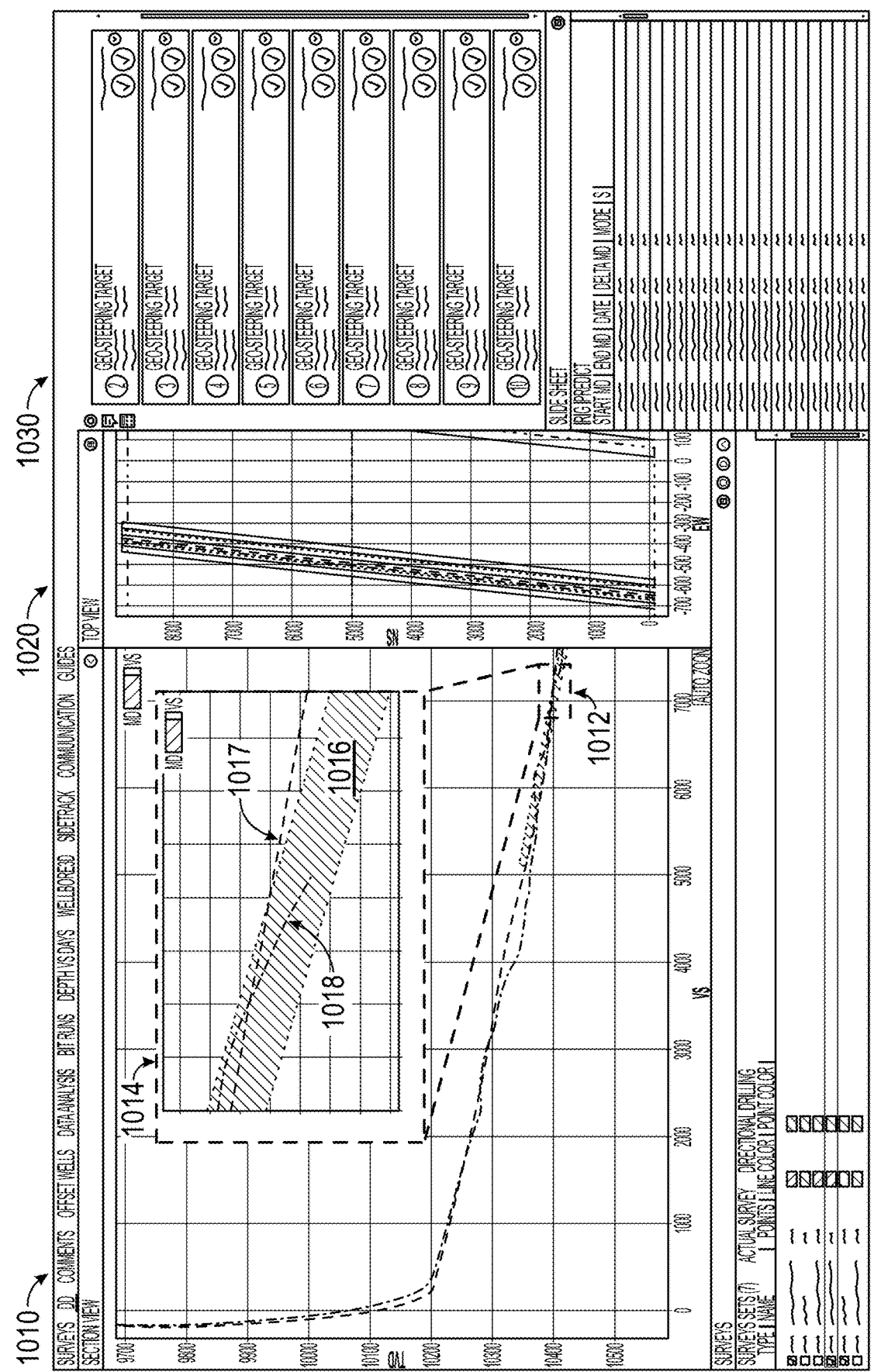

FIG. 10A is a screenshot of a user-interface of the present disclosure. In the window at 1010, a plot of TVD versus VS is shown for a live cross-section of the well being drilled. An expanded version of region 1012 is shown in window 1014. The crosshatched area 1016 represents the target zone for drilling for that depth. The line 1017 represents the pre-drilling planed path for drilling thought the formation. The line 1018 represents the drill path though the target zone. A live plat view 1020 is shown in the window beside the main plot. A target history 1030 is maintained and shown the user as part of the display.

Figure 10B:
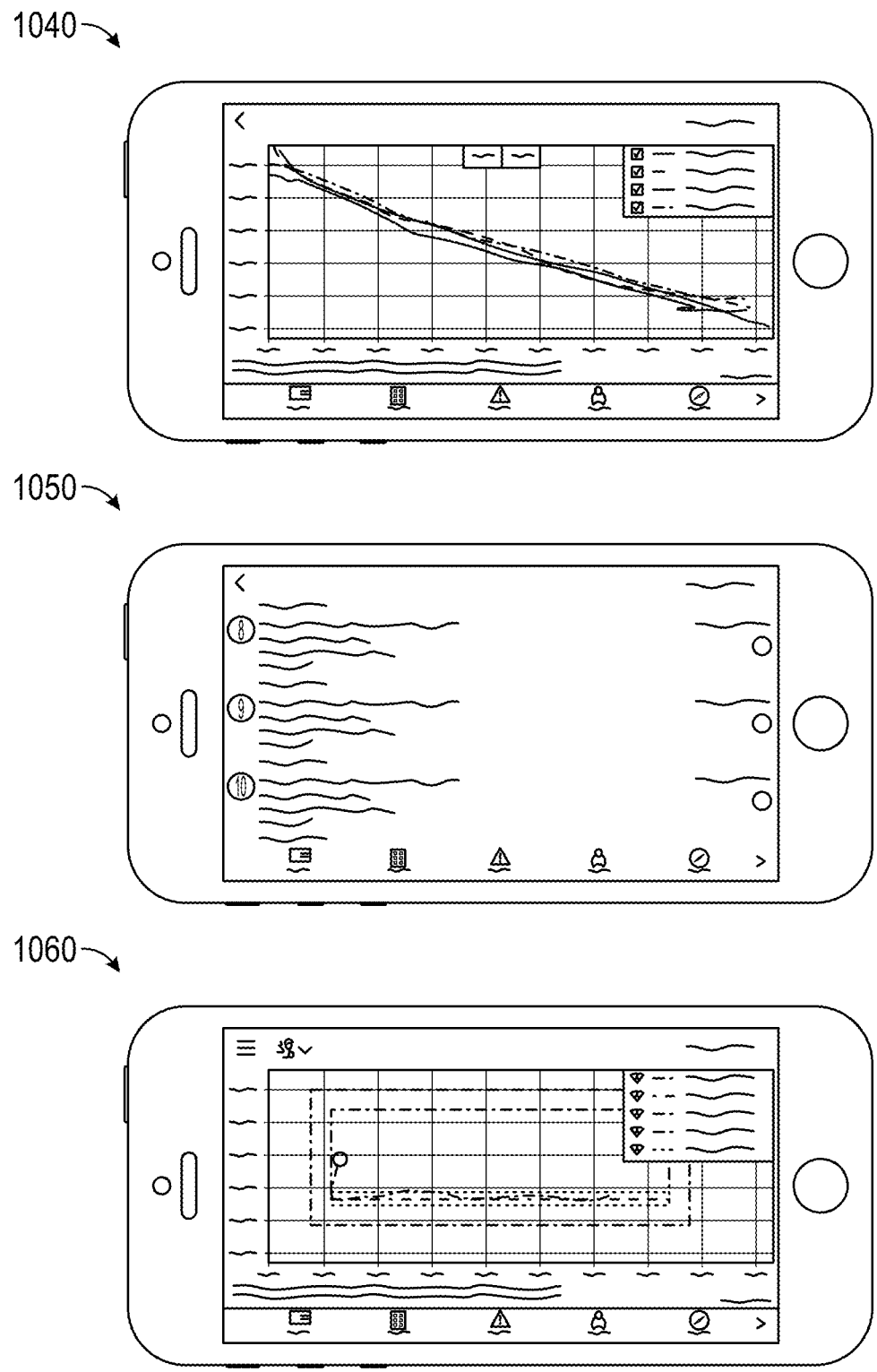

FIG. 10B is a series of screenshots from mobile or tablet applications for monitoring a drilling operation. Display 1040 shows a live cross section of a well being drilled. This is a version of the display 1010 that has been modified to be meaningful on a smaller display. Display 1050 is a target history that has been modified to be meaningful on a smaller display. Display 1060 is a live plat view that has been modified to be meaningful on a smaller display.

Figure 14:
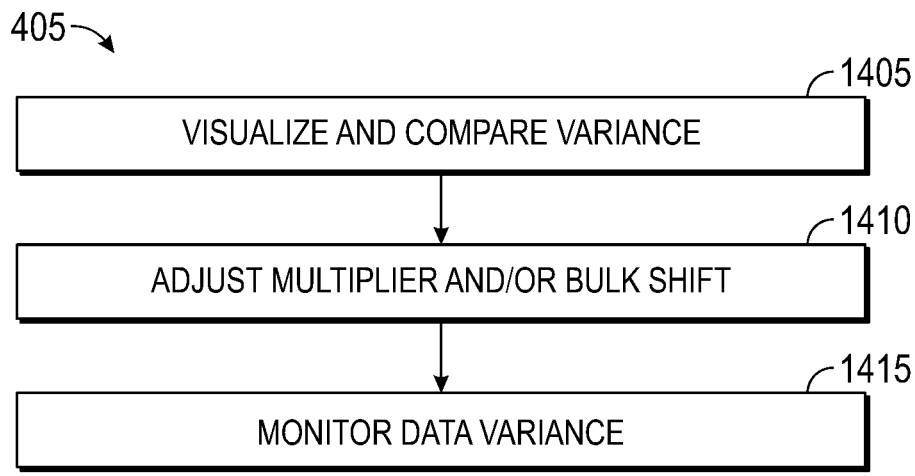
FIGS. 14-19 are block diagram of an exemplary drilling monitoring operation of the present disclosure.

FIG. 14 is a flow chart illustrating an example method of calibrating MWD tool data (block 405). The terminal and/or the control system 300 visualize the MWD tool data and compare variance (block 1405). The terminal and/or the control system 300 adjust the multiplier and/or bulk shift (block 1410). The terminal and/or the control system 300 monitor that data variance (block 1415). In certain example embodiment, one or more of blocks 1405, 1410, and 1415 may be performed in a different order, repeated, or omitted. In certain example embodiments, one or more of blocks 1405, 1410, and/or 1415 are performed, at least in part, based on human input.

Figure 15:
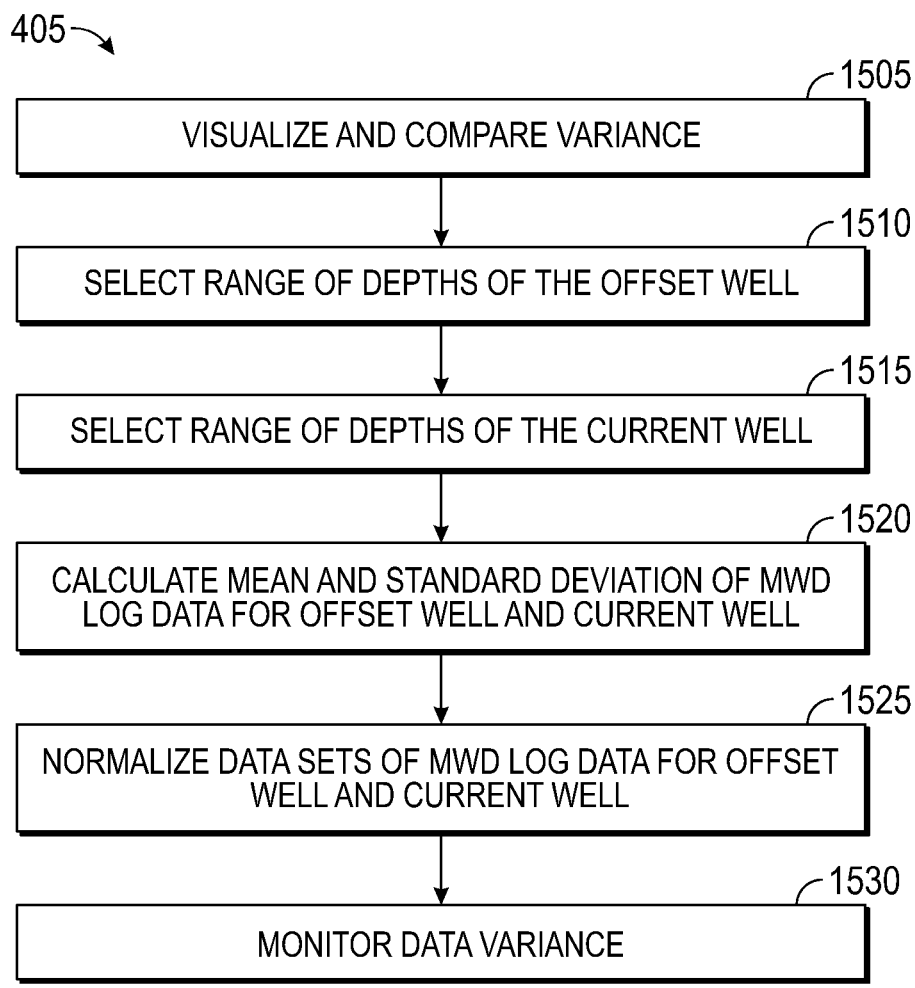

FIG. 15 is a flow chart illustrating another example method of calibrating MWD tool data (block 405). In block 1505, the terminal and/or the control system 300 visualize and compare the variance of MWD log data. In certain example embodiments the MWD log data is gamma ray (GR) data. In other example embodiments, the MWD log data includes data from one or more tools including acoustic, neutron, gamma ray, density, photoelectric, nuclear magnetic resonance, induction, resistivity, caliper, coring, seismic, rotary steering and/or any other commercially available well tool. In block 1510, the terminal and/or the control system 300 select a range of depths of the offset well for analysis. Then, in block 1510, a range of depths of the current well is selected (block 1515). In certain example embodiments, the selection is performed visually by marking portion of the well. In other example embodiments, the selection is performed by receiving TVD or MD values. Based on the ranges selected in block 1510 and 1515, the terminal and/or the control system 300 then calculate a mean and standard deviation of the MWD log data for the offset well and current well (block 1520). The terminal and/or the control system 300 then normalized data sets of the MWD log data for offset well and current well (block 1525). In block 1530, the data variance is monitored to determine whether calibration should be repeated. In certain example embodiment, one or more of blocks 1505, 1510, 1515, 1520, 1525, and 1530 may be performed in a different order, repeated, or omitted. In certain example embodiments, one or more of blocks 1505, 1510, 1515, 1520, 1525, and 1530 are performed, at least in part, based on human input.

Figure 16:
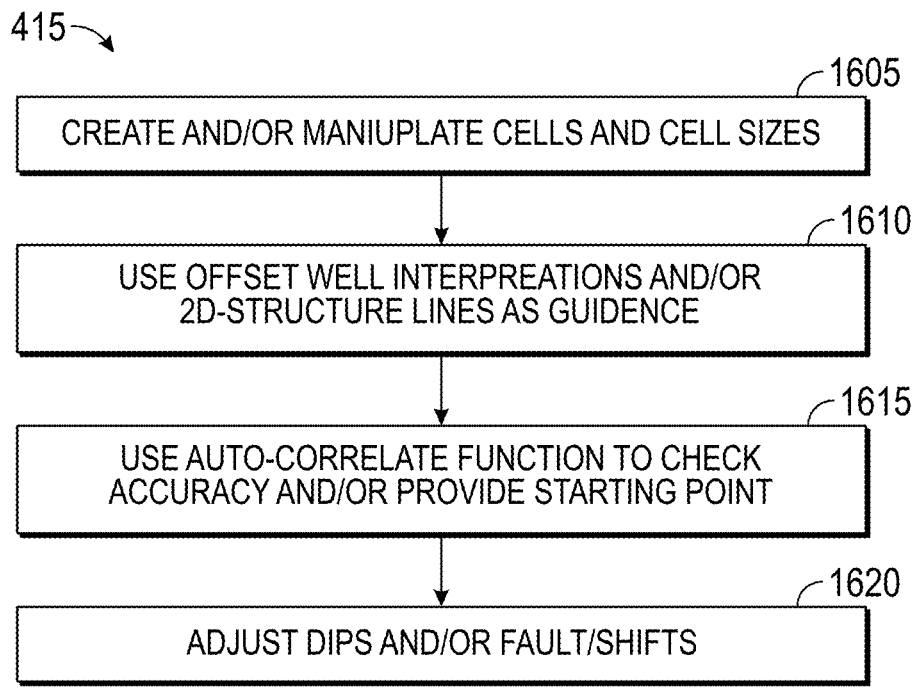

FIG. 16 is a flow chart illustrating an example method of correlating MWD data for the current well to one or more offset wells (block 415). The terminal and/or the control system 300 created and/or manipulate cells and cell sizes (block 1605). In certain example implementations, block 1605 is based, at least in part, on user input. For example, a user may use or more input devices to create or modify cell sizes. In other example embodiments, the creation and/or manipulation of cell sizes is performed, at least in part, pragmatically by terminal and/or the control system 300. In certain example embodiments, the terminal and/or the control system 300 perform an auto-correlation of the cells, although the cells may be defined by a user. In still other embodiments, the terminal and/or the control system 300 define one or more cells. For example, the terminal and/or the control system 300 perform a moving average analysis to identify a best match cell, the cell is "cut," and auto-correlated. The terminal and/or the control system 300 may use offset well interpretations and/or 2D-structure lines as guidance. As shown in FIGS. 6-10, a two-dimensional structure line was generated along the well path within an example mapping application. This 2D line (640) is a simple representation of an overall 3D structure map provided by a geologist. In certain example embodiments, the mapping application sends X/Y data points with a depth in SSTVD or TVD to draw the line in the 2D cross section view. In certain example embodiments, the terminal and/or control system 300 use auto-correlation function to check accuracy of the correlation or to produce a starting point (block 1615). The terminal and/or control system 300 may further adjust dips and/or faults and/or shifts to correlate the MWD data for the current well to offset well (block 1620). In certain example embodiment, one or more of blocks 1605, 1610, 1615, and 1620 may be performed in a different order, repeated, or omitted. In certain example embodiments, one or more of blocks 1605, 1610, 1615, and 1620 are performed, at least in part, based on human input.

Figure 17:
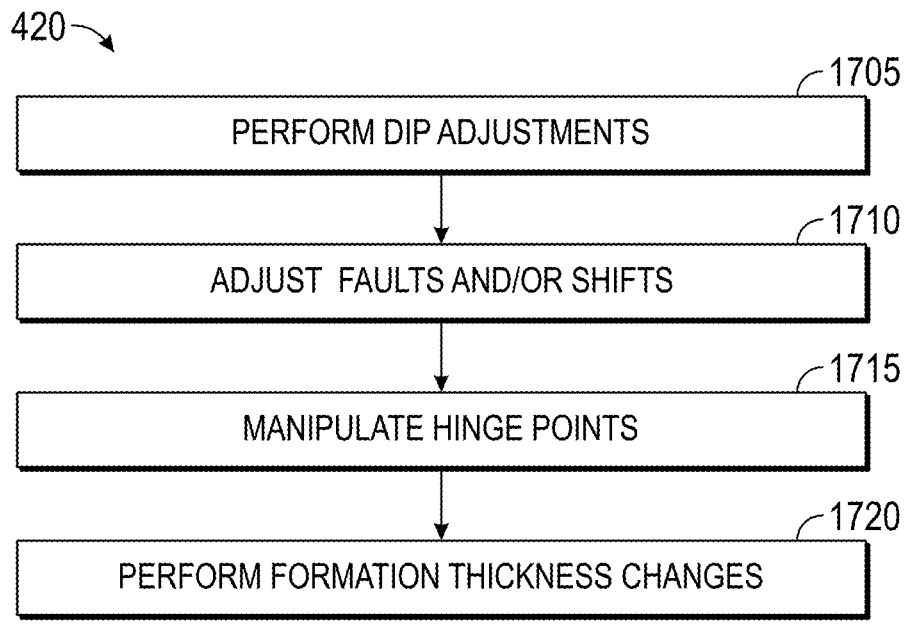

FIG. 17 is a flow chart illustrating an example method of calculating formation trajectory (block 420). In block 1705, the terminal and/or control system 300 may adjust formation representations based on performing dip adjustments. The terminal and/or control system 300 may adjust formation representations based on adjusting faults and/or shifts (block 1710). The terminal and/or the control system 300 may adjust formation representations based on manipulating one or more hinge points (block 1715). The terminal and/or control system 300 may adjust formation representations based on performing formation thickness changes (block 1720). In certain example embodiment, one or more of blocks 1705, 1710, 1715, and 1720 may be performed in a different order, repeated, or omitted. In certain example embodiments, one or more of blocks 1705, 1710, 1715, and 1720 are performed, at least in part, based on human input.

Figure 18:
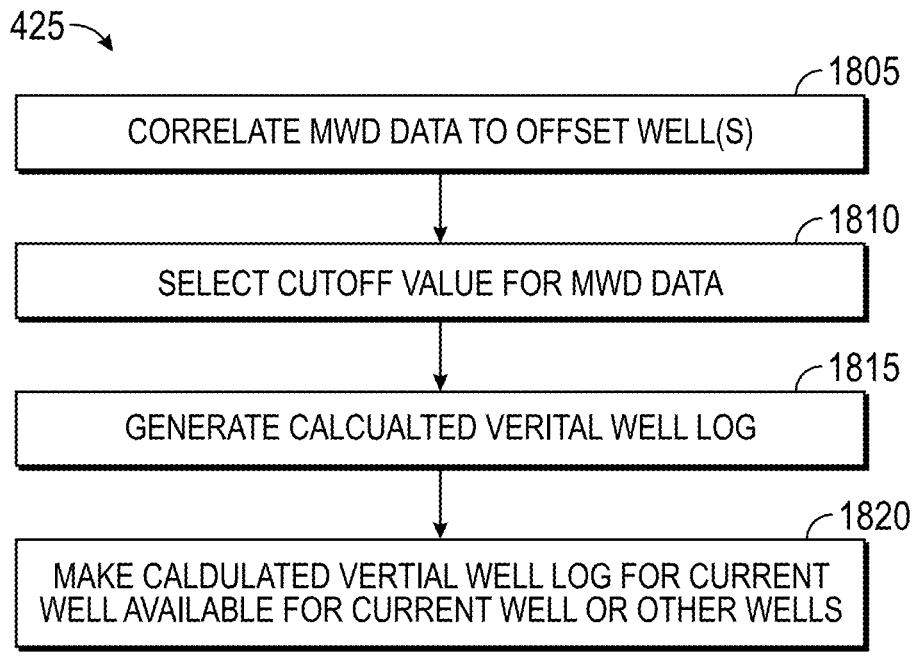

FIG. 18 is a flow chart illustrating an example method of determining a calculated vertical well log for the current well (block 425). The terminal and/or control system 300 correlated MWD data to one or more offset wells (block 1805). Then, the terminal and/or control system select a cutoff value for MWD data from the current well (block 1810). The cutoff values may be one or both of an upper and lower range of depths in the current well. The terminal and/or control system 300 then generate a calculated vertical well log (block 1815). In certain example embodiments, the calculated vertical well log for the current well is made available for comparison with the current well or for other wells (block 1820). In certain example embodiment, one or more of blocks 1805, 1810, 1815, and 1820 may be performed in a different order, repeated, or omitted. In certain example embodiments, one or more of blocks 1805, 1810, 1815, and 1820 are performed, at least in part, based on human input.

Figure 19:
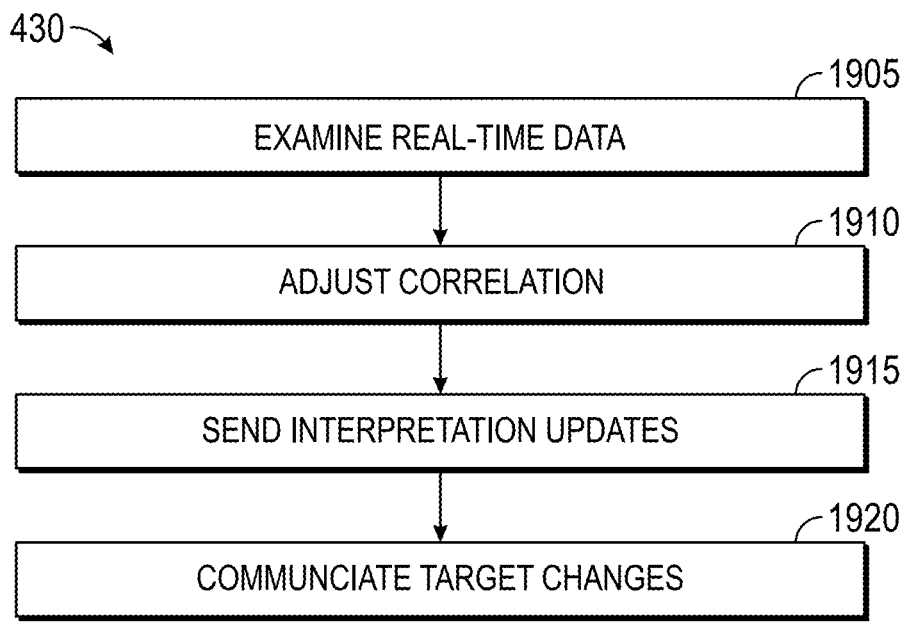

FIG. 19 is a flow chart of an example method of monitoring and controlling drilling operations (block 430). In certain example implementations, the terminal and/or control system 300 examine real-time data from one or more wells (block 1950). The correlations between the current well MWD data and the predicted geology may be adjusted based on the real-time data (block 1910). The changes correlations may be referred to as "interpretations" and updates to these interpretations may be communicated to others (block 1915). In one example implementation, updated interpretations are communicated to a directional driller that is drilling the current well. In certain example implementations, the control system 300 tracks which users have viewed an updated interpretation and provides a visual indication of which users have viewed the updated interpretation. In this way, the user that created the updated interpretation can ensure that other users who need to see the updated interpretation have done so. Similarly, one or more target changes may be made and communicated to other users (block 1920). In certain implementations, the control system 300 tracks which users have viewed the changed one or more targets and provides a visual indication that those users have viewed the updated one or more targets. In certain example embodiment, one or more of blocks 1905, 1910, 1915, and 1920 may be performed in a different order, repeated, or omitted. In certain example embodiments, one or more of blocks 1905, 1910, 1915, and 1920 are performed, at least in part, based on human input.

Figure 5:
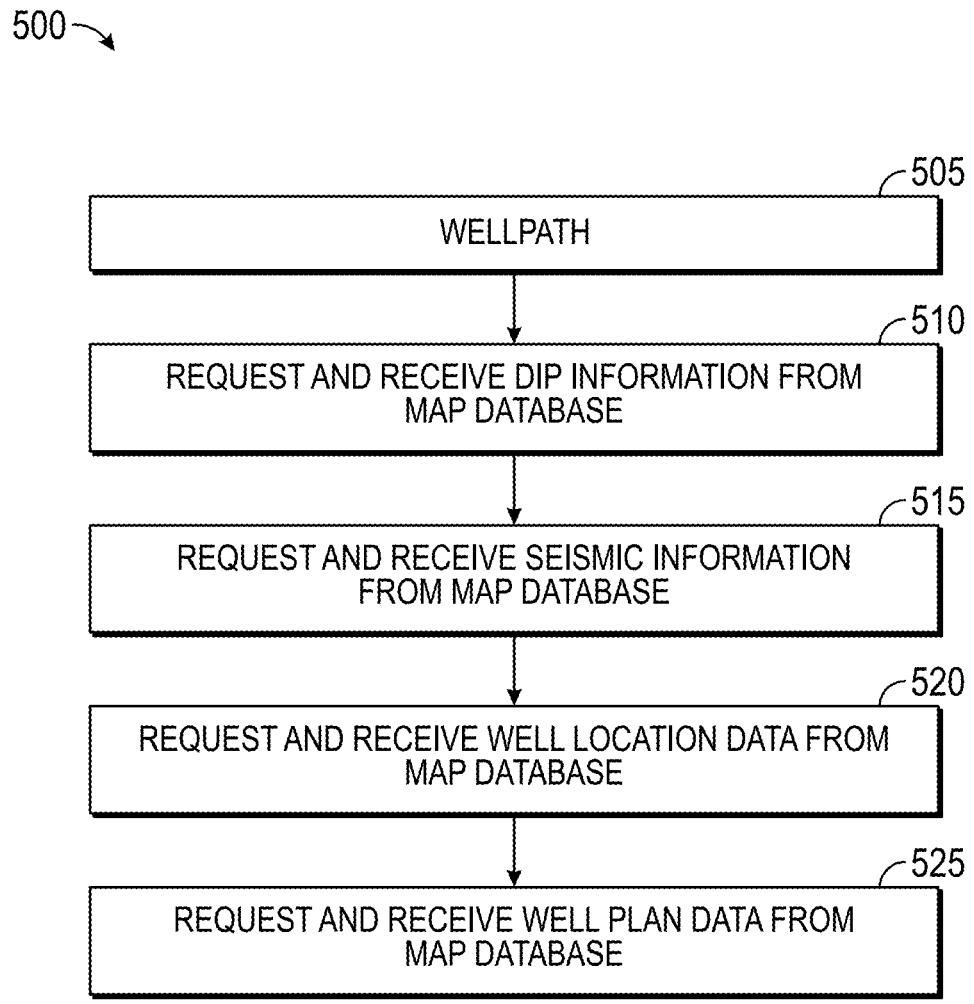

FIG. 5 shows an example method for predicting the subterranean formation shape and characteristics based on data from the map database 308. In certain example implementations, the user terminal 316 provides a representation of the current well path (block 505) to the control unit 300. The control unit 300, in turn, queries the map database 308 for information about the region of interest. In other example embodiments, the user terminal 316 directly interacts with the map database 308. In block 510, the user terminal 316 retrieves structure lines along wellbore from the map database 308 (block 510). In certain example implementations, the user terminal 316 sends well path information to the map database 308 (block 510) and, in turn, the map database 308 returns a two dimensional line representing the bedding dip of the rock formations local to where the well is being drilled. embodiments, this information aides users (such as geosteerers) to predict the formation shape and characteristics before drilling though the formation. In certain example embodiments, map database 308 includes surfaces and horizons data which may be passed to the control unit 300 by an application programming interface (API). In certain example embodiments, map database 308 includes Seg-Y and seismic volumes and slices which may be passed to the control unit 300 by an application programming interface (API). In certain example embodiments, map database 308 includes embedded maps which may be passed to the control unit 300. Embedded maps may include one or more of wells, land, well plans, and rasters. Tools may be provided to measure, draw, set offsets, or symbolize the maps.

In block 515, user terminal 316 requests and receives seismic information about the region of interest from the map database 308. In certain example embodiments, the user terminal 316 sends well path information to the map database 308, which, in turn, returns a two dimensional image of a slice of 3D seismic data. In certain example embodiments the returned two-dimensional image is rendered with a specific spectrum to highlight rock formations of interest local to where the well is being drilled.

In block 520, the user terminal 316 and requests and receives well location data from the map database 308. In block 520, the user terminal 316 and requests and receives well plan data from the map database 308.

Modifications, additions, or omissions may be made the method of FIG. 5 without departing from the scope of the present disclosure. For example, the order of the steps may be performed in a different manner than that described and some steps may be performed at the same time. Additionally, each individual step may include additional steps without departing from the scope of the present disclosure. In certain embodiments, one or more steps of FIG. 5 may be omitted.

In certain example embodiments, the user terminal 316 further supports message exchange with other terminals. In one example embodiment the user terminal 316 supports target message exchange, whereby sequential list of targets the geosteerer has issued from the application are sent to other users connected through controls system 300. In certain example embodiments, targets can be acknowledged to let the geosteerer and other parties involved that the correct people have seen the update and action will be taken.

In certain example embodiment, the application running on user terminal 316 provides a list of watching users. The list of watching users may list of all users that are currently monitoring the selected well.

In certain example implementations, multiple users will be able to access the software to monitor and control drilling operations. Certain users will have different access right. For example, a user with an "Editor" permission will have full access with the ability to publish updated interpretations. Other users may be limited to "Rig View Only" permissions, where the user will see live data streaming into the application, as well as updates when a geosteerer updates the interpretation. The "Rig View Only" permission user, however, will have limited or no ability to alter the interpretation. Other example users may have an "Office View Only" permission. This user may have full control of the application without any ability to publish updated interpretations.

In certain example implementation, the user terminal 316 may be provided with an application for drilling engineering. The drilling engineering application may provide access to interpretation data, both planned and actual. Example implementations provide drilling engineers to see the wellbore and targets. In certain example embodiments, the wellbore and targets are updated in real time.

Figure 20B:
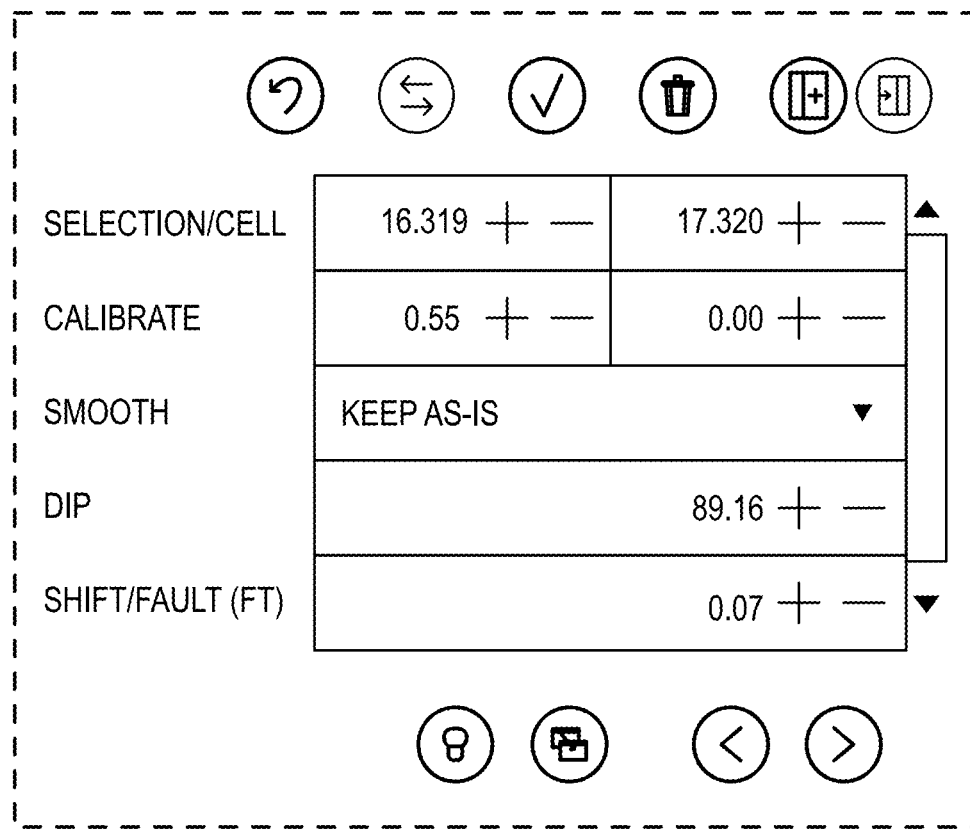
Figure 20C:
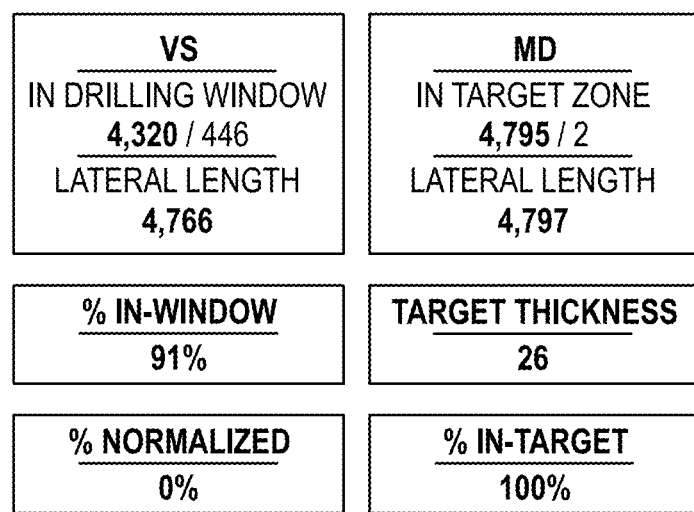

FIGS. 20A, 20B, 20C; 21A, 21B, 21C; 22A, 22B, 22C; 23A, 23B, 23C; and 24A, 24B, 24C are sets of screen shots of an application for monitoring and controlling a drilling operation that demonstrate a cell cutting operation In general, well data may be segmented into one or any number of cells. Cells may be spit or merged. Each cell may have an independent start and end depth, calibration, smooth, dip, and shift/fault. FIG. 20A is a screenshot of a user-interface of the present disclosure. Further details of regions 20B and 20C are shown in detail in FIGS. 20B and 20C, respectively. In certain example embodiments, the cell cutting operation is used to select a portion of a log to apply a separate interpretation. As shown in FIG. 20A, the new log data 2010 does not match or correlate with the current calculated log data for a single dip for the current cell size.

Figure 21B:
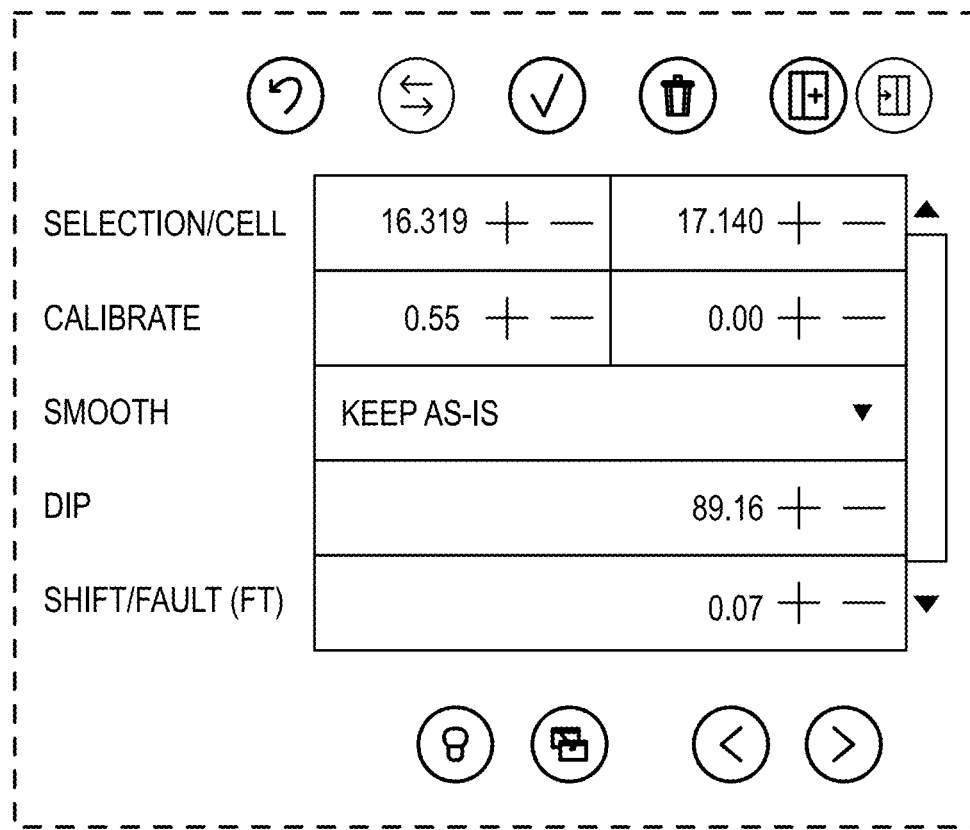
Figure 21C:
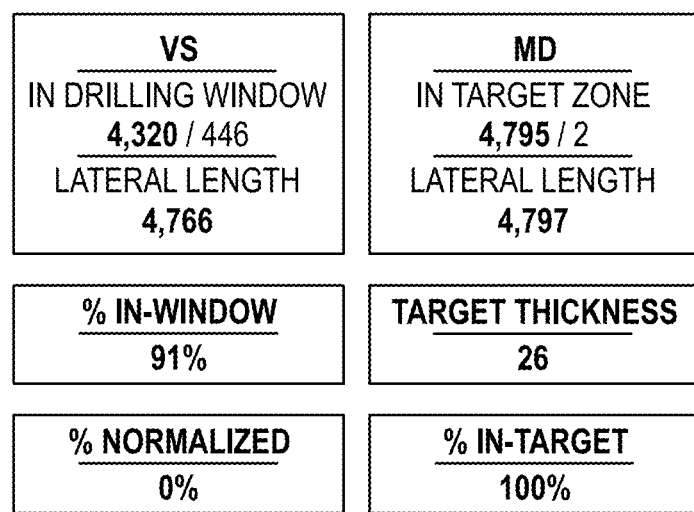

FIG. 21A is a screenshot of a user-interface of the present disclosure. Further details of regions 21B and 21C are shown in detail in FIGS. 21B and 21C, respectively. The current cell includes regions 2120 and 2130. As shown here, the portion 2130 is "cut" to remove the data from the cell defined by 2120. This results in calculated well log 2110 in the correlation windows (left-hand size) that has less data visible when compared with the corresponding curve in FIG. 20A.

Figure 22B:
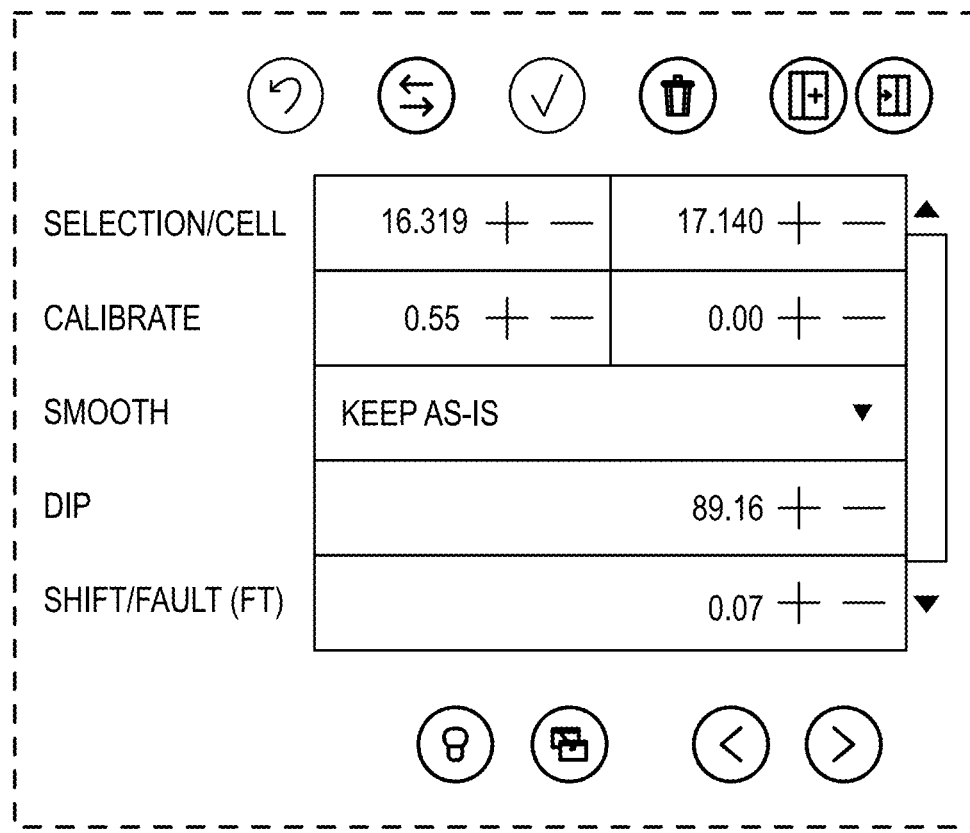
Figure 22C:
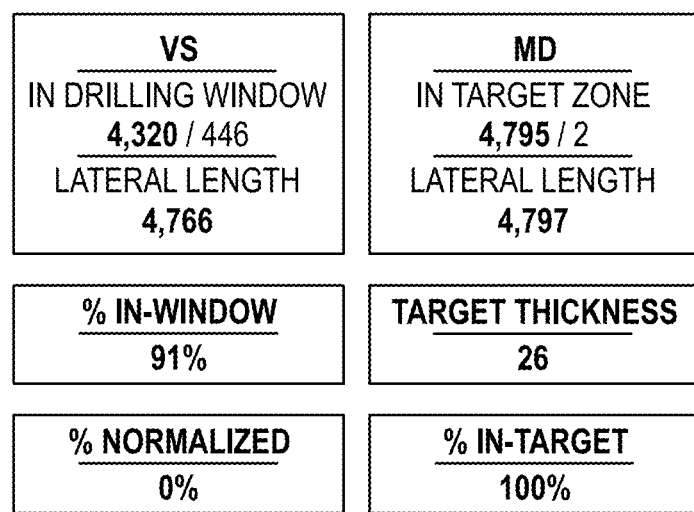

FIG. 22A is a screenshot of a user-interface of the present disclosure. Further details of regions 22B and 22C are shown in detail in FIGS. 22B and 22C, respectively. With the current "dip" (as shown in FIG. 22B) the measured log of the well matches to or correlates with the calculated log data. The user or system will therefore move the to the newly created cell that was created by cutting region 2130 from region 2120.

Figure 23B:
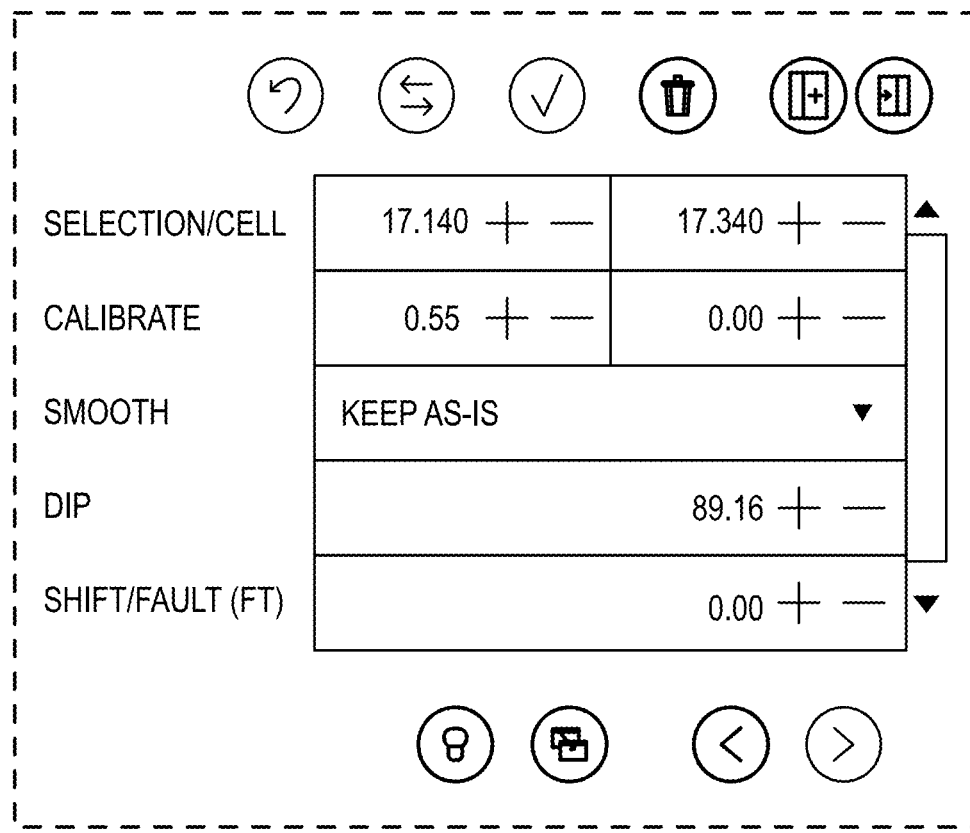
Figure 23C:
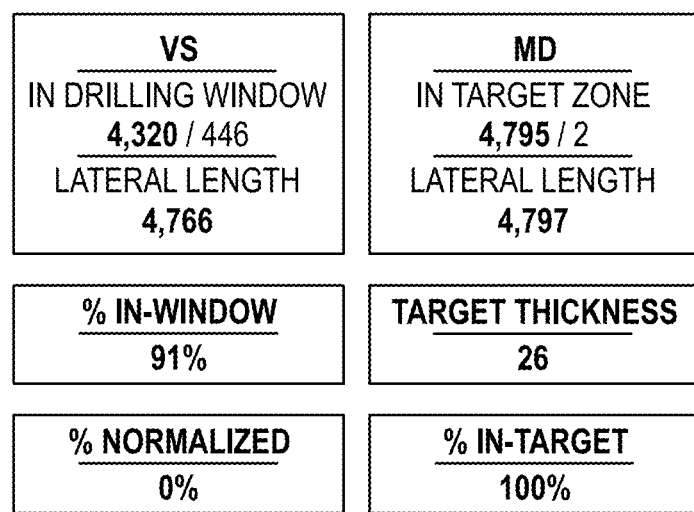

FIG. 23A is a screenshot of a user-interface of the present disclosure. Further details of regions 23B and 23C are shown in detail in FIGS. 23B and 23C, respectively. In this example embodiment, the interpretation of region 2130 is altered by changing the dip for the region 2130 (shown at 2310 in FIG. 23a) until it matches or correlates with the measured log data. In this example embodiment, the interpretation of region 2130 is already by changing the dip, in other example embodiments one or more of start and end depth, calibration, smooth, dip, and shift/fault may be altered.

Figure 24B:
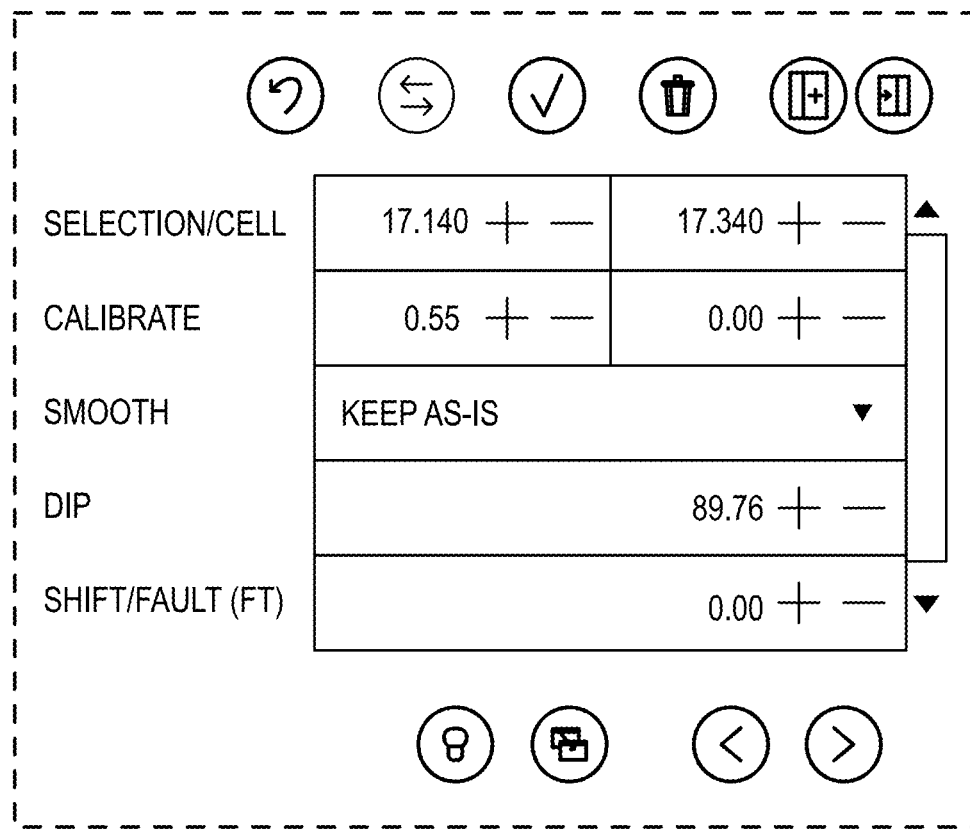
Figure 24C:
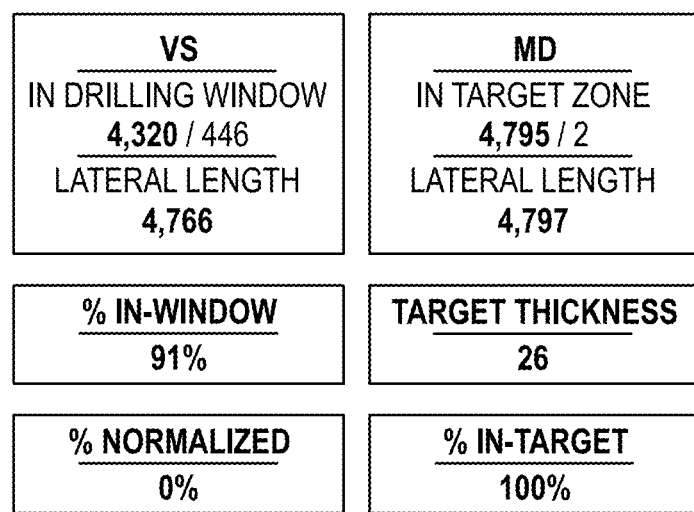

FIG. 24A is a screenshot of a user-interface of the present disclosure. Further details of regions 24B and 24C are shown in detail in FIGS. 24B and 24C, respectively. As shown in 22B, the dip is changed from 89.16 to 89.76 to better match or better correlate the interpretation of the collected data to the calculated well log for the 2130 region (shown as 2410 in FIG. 24A).

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

A number of examples have been described. Nevertheless, it will be understood that various modifications can be made. Accordingly, other implementations are within the scope of the following claims.

What is claimed is:

1. A method for controlling a drilling operation in a subterranean formation, comprising:
    generating a simulated well log for a simulated vertical well based, at least in part, on a subset of an MWD log from an offset horizontal well, wherein the subset of the MWD log is for measured depths between a starting measured depth and an ending measured depth;
    monitoring and/or controlling a drilling operation of drilling a deviated/horizontal wellbore based, at least in part, on the simulated well log generated for the simulated vertical well;
    generating an alert that the deviated/horizontal wellbore is a predefined distance below the top of a target window or above the bottom of the target window or is no longer within the target window; and
    using the alert to warn a drilling operator that some operation needs modification or correction.

2. The method of claim 1, further comprising:
    receiving, from a user, the subset of the MWD log to use for generating the simulated well log for the simulated vertical well.

3. The method of claim 1, further comprising:
    generating a visual display of the simulated well log generated for the simulated vertical well.

4. The method of claim 1, wherein generating the simulated well log for the simulated vertical well is further based, at least in part, on log values from one or more other offset wells.

5. The method of claim 4, wherein at least one of the other offset wells is an offset vertical well and wherein the log values from the offset vertical well are from wireline logging.

6. The method of claim 1, further comprising:
    generating a visual display of the horizontal offset well.

7. The method of claim 6, further comprising:
    generating a visual display of a current the deviated/horizontal wellbore being formed via the drilling operation in a same window as the visual display of the horizontal offset well.

8. The method of claim 1, wherein the MWD log is a gamma log.

9. The method of claim 1, wherein the MWD log is a three-axis gamma log.

10. The method of claim 1, wherein the simulated well log generated for the simulated vertical well is a gamma log.

11. The method of claim 1, wherein the simulated well log generated for the simulated vertical well is a spontaneous potential (SP) log.

12. A system for drilling in a subterranean formation comprising:
    a drillstring;
    at least one processor to monitor and control the drillstring;
    a memory coupled to the at least one processor, the memory including non-transitory executable instructions, that, when executed cause the at least one processor to:
        generate a simulated well log for a simulated vertical well based, at least in part, on a subset of an MWD log from an offset horizontal well, wherein the subset of the MWD log is for measured depths between a starting measured depth and an ending measured depth;
        monitor and/or control a drilling operation of drilling a deviated/horizontal wellbore based, at least in part, on the simulated well log generated for the simulated vertical well;
        generate an alert that the deviated/horizontal wellbore is a predefined distance below the top of a target window or above the bottom of the target window or is no longer within the target window; and
        use the alert to warn a drilling operator that some operation needs modification or correction.

13. The system of claim 12, wherein the executable instructions further cause the least one processor to:
   receive, from a user, the subset of the MWD log to use for generating the simulated well log for the simulated vertical well.

14. The system of claim 12, wherein the executable instructions further cause the least one processor to:
   generate a visual display of the simulated well log generated for the simulated vertical well.

15. The system of claim 12, wherein the executable instructions further cause the at least one processor to:
   generate the simulated well log for the simulated vertical well further based, at least in part, on log values from one or more other offset wells.

16. The system of claim 15, wherein at least one of the other offset wells is an offset vertical well and wherein the log values from the offset vertical well are from wireline logging.

17. The system of claim 12, wherein the executable instructions further cause the at least one processor to:
   generating a visual display of the horizontal offset well.

18. The system of claim 12, wherein the MWD log is a gamma log.

19. The system of claim 12, wherein the MWD log is a three-axis gamma log.

* * * * *